(12) United States Patent
Yokoyama et al.

(10) Patent No.: US 8,947,359 B2
(45) Date of Patent: Feb. 3, 2015

(54) INFORMATION PROCESSING APPARATUS AND OPERATION METHOD OF INFORMATION PROCESSING APPARATUS

(75) Inventors: Daiki Yokoyama, Nagano (JP); Yasutaka Fujii, Nagano (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 13/086,684

(22) Filed: Apr. 14, 2011

(65) Prior Publication Data

US 2011/0279373 A1 Nov. 17, 2011

(30) Foreign Application Priority Data

May 14, 2010 (JP) .................................. 2010-111780

(51) Int. Cl.
*G06F 3/02* (2006.01)
*G06F 1/16* (2006.01)
*G06F 3/01* (2006.01)

(52) U.S. Cl.
CPC ............ *G06F 1/1616* (2013.01); *G06F 1/1694* (2013.01); *G06F 3/017* (2013.01); *G06F 2200/1637* (2013.01)
USPC ............................. 345/168; 345/169; 715/863

(58) Field of Classification Search
None
See application file for complete search history.

(56) References Cited

U.S. PATENT DOCUMENTS

| 6,542,606 | B1* | 4/2003 | Lehtinen et al. | 379/433.05 |
| 7,931,535 | B2* | 4/2011 | Ikeda et al. | 463/38 |
| 2004/0150635 | A1* | 8/2004 | Clapper | 345/204 |
| 2009/0303205 | A1* | 12/2009 | Seibert et al. | 345/204 |
| 2010/0090971 | A1* | 4/2010 | Choi et al. | 345/173 |
| 2010/0188328 | A1* | 7/2010 | Dodge et al. | 345/156 |
| 2011/0210983 | A1* | 9/2011 | Theimer et al. | 345/634 |

FOREIGN PATENT DOCUMENTS

JP 2003-345492 12/2003

\* cited by examiner

*Primary Examiner* — Joe H Cheng
*Assistant Examiner* — Yaron Cohen
(74) *Attorney, Agent, or Firm* — Oblon, Spivak, McClelland, Maier & Neustadt, L.L.P.

(57) ABSTRACT

An information processing apparatus includes: an apparatus body including a body having a keyboard and a display unit attached to the body so as to be opened and closed; an acceleration sensor mounted on the apparatus body; a gesture motion determination unit mounted on the apparatus body and determining a reference posture of a holding state of the apparatus body taken when a user executes a given gesture function while holding the apparatus body based on acceleration detected by the acceleration sensor as well as determining a gesture motion executed by the user by detecting posture change of the apparatus body from the reference posture based on acceleration detected by the acceleration sensor; and an operation execution unit mounted on the apparatus body and executing a given operation corresponding to the gesture motion executed by the user based on the determination result in the gesture motion determination unit.

8 Claims, 17 Drawing Sheets

POSTURE IN HORIZONTAL POSITION WHEN GESTURE MOTION IS PERFORMED

APPEARANCE VIEW OF INFORMATION PROCESSING APPARATUS

EXAMPLE OF PROCESSING BLOCKS FOR GESTURE FUNCTION

EXAMPLE OF HOLDING INFORMATION
PROCESSING APPARATUS IN HORIZONTAL POSITION

EXAMPLE OF HOLDING INFORMATION
PROCESSING APPARATUS IN VERTICAL POSITION

REFERENCE POSTURE IN HORIZONTAL POSITION

OUTPUT VALUE OF X-AXIS DIRECTION

POSTURE IN HORIZONTAL POSITION WHEN GESTURE MOTION IS PERFORMED

OUTPUT VALUE OF X-AXIS DIRECTION

HOLDING POSTURE EXAMPLES IN VERTICAL POSITION

SYNTHETIC VECTOR OF Y-Z PLANE

REFERENCE POSTURE IN VERTICAL POSITION

OUTPUT VALUE OF Y-AXIS DIRECTION

EXAMPLE OF SETTING VIRTUAL AXIS

CALCULATION PRINCIPLES OF OUTPUT VALUE ON VIRTUAL Y-AXIS

REFERENCE POSTURE IN VERTICAL POSITION

POSTURE IN VERTICAL POSITION WHEN GESTURE MOTION IS PERFORMED

FLOWCHART OF GESTURE MOTION

FLOWCHART OF DETERMINATION OF GESTURE MOTION

EXAMPLE OF PROCESSING BLOCKS FOR GESTURE FUNCTION IN RELATED ART

FLOWCHART OF GESTURE MOTION IN RELATED ART

INFORMATION PROCESSING APPARATUS AND OPERATION METHOD OF INFORMATION PROCESSING APPARATUS

BACKGROUND OF THE TECHNOLOGY

1. Field of the Technology

The present technology relates to an information processing apparatus and an operation method of the information processing apparatus, and particularly relates to an information processing apparatus in which various operations can be performed in a state of being held by user's hands and an operation method of the information processing apparatus.

2. Description of the Related Art

Various portable electronic apparatuses having an information processing function have been developed heretofore, and various techniques for improving operationality of these portable electronic apparatuses have been also proposed (for example, refer to JP-A-2003-345492 (Patent Document 1)).

In Patent Document 1, a portable electronic apparatus operated in a state of being held by a user's hand is described. The portable electronic apparatus includes a triaxial acceleration sensor, determining whether the portable electronic apparatus is swung (shaken) by the user or not based on accelerations Ax, Ay and Az in X, Y and Z-axis directions detected by the acceleration sensor. The portable electronic apparatus serves a given function based on the determination result.

The portable electronic apparatus of Patent Document 1 makes the above determination by calculating a reference acceleration value ($[Ax^2+Ay^2+Az^2]^{1/2}$) as well as inclination angles $\theta$, $\phi$ in X, Y and Z-axis directions from accelerations Ax, Ay and Az in X, Y and Z-axis directions.

SUMMARY OF THE TECHNOLOGY

In recent years, miniaturization has further progressed not only in the portable electronic apparatus proposed in Patent Document 1 but also in, for example, a notebook personal computer (hereinafter referred to as a notebook PC), and a notebook PC which can be operated in a state of being held by user's hands is proposed. Diversification and improvement of operationality in a function of associating a given motion (gesture) performed by the user while holding the notebook PC with hands with a given operation of the notebook PC (hereinafter referred to as a gesture function) are desired also in a portable notebook PC.

In view of the above, it is desirable to realize diversification of the gesture function and improvement of operationality of the gesture function in the information processing apparatus including the gesture function and the operation method thereof.

According to an embodiment of the present technology, there is provided an information processing apparatus including an apparatus body including a body having a keyboard and a display unit attached to the body so as to be opened and closed, an acceleration sensor mounted on the apparatus body, a gesture motion determination unit and an operation execution unit. Configurations and functions of the gesture motion determination unit and the operation execution unit are as follows. The gesture motion determination unit is mounted on the apparatus body and determines a reference posture of a holding state of the apparatus body taken when a user executes a given gesture function while holding the apparatus body based on acceleration detected by the acceleration sensor. The gesture motion determination unit also determines a gesture motion executed by the user by detecting posture change of the apparatus from the reference posture based on acceleration detected by the acceleration sensor. The operation execution unit is mounted on the apparatus body and executes a given operation corresponding to the gesture motion executed by the user based on the determination result in the gesture motion determination unit.

An operation method of an information processing apparatus according to another embodiment is an operation method of the above information processing apparatus according to the embodiment of the present technology, which is performed in accordance with the following steps. First, the gesture motion determination unit determines a reference posture of a holding state of the apparatus body taken when a user executes a given gesture function while holding the apparatus body based on acceleration detected by the acceleration sensor. Next, the gesture motion determination unit determines a gesture motion executed by the user by detecting posture change of the apparatus body from the reference posture based on acceleration detected by the acceleration sensor. Then, the operation execution unit executes a given operation corresponding to the determined gesture motion executed by the user based on the determination result of the gesture motion.

As described above, in the information processing apparatus according to the embodiment of the present technology, the gesture motion determination unit determines the reference posture (holding manner) of a holding state of the apparatus body based on acceleration detected by the acceleration sensor. Next, the gesture motion determination unit determines the executed gesture motion based on acceleration detected by the acceleration sensor, and a given gesture function is executed by the operation execution unit based on the determination result. Therefore, it is possible to realize the gesture function in various holding manners of the apparatus body according to the embodiment of the present technology.

According to the embodiment of the present technology, the gesture function can be realized in various holding manners of the apparatus body. Therefore, it is possible to realize diversification of the gesture function and improvement of operationality of the gesture function in the information processing apparatus having the gesture function and the operation method thereof.

DESCRIPTION OF THE PREFERRED EMBODIMENTS

Hereinafter, an example of an information processing apparatus and an operation method thereof according to an embodiment of the present technology will be explained in the following order with reference to the drawings. The configuration of the present technology is not limited to the embodiment.

1. A basic configuration example of an information processing apparatus
2. Processing blocks of a gesture function
3. An outline and operation principles of the gesture function
4. A processing example of the gesture function <1. A Basic Configuration Example of an Information Processing Apparatus>
[Appearance Configuration of the Information Processing Apparatus]

Figure 1:
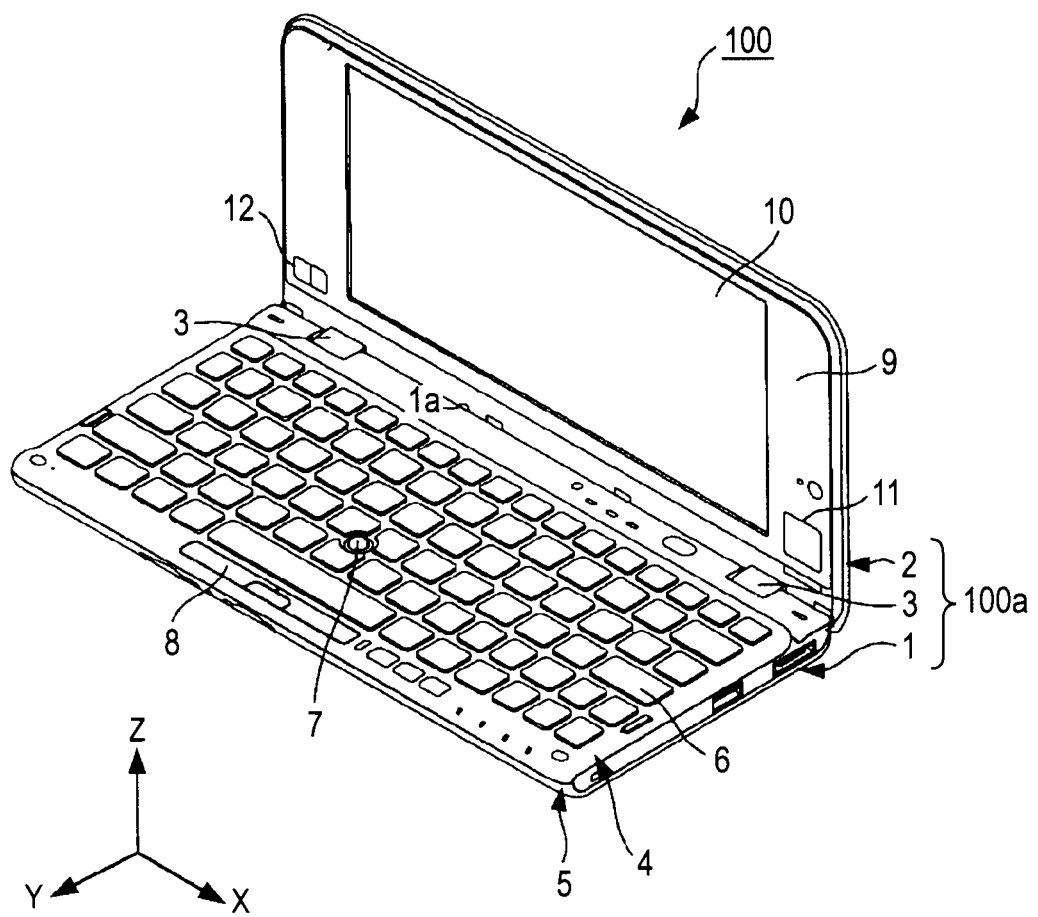
FIG. 1 is an appearance perspective view of an information processing apparatus according to an embodiment of the present technology.

FIG. 1 is an appearance perspective view of an information processing apparatus according to an embodiment of the present technology. A notebook PC is used as an example of the information processing apparatus for explanation in the embodiment, however, the present technology is not limited to this and can be applied to optional information processing apparatuses having a gesture function.

An apparatus body 100a of an information processing apparatus 100 includes a body 1, a display unit 2 and two hinges 3. In the example shown in FIG. 1, two hinges 3 are attached to portions close to both ends of a long-side end 1a on the display unit 2 side of the body 1, and the display unit 2 is attached to the body 1 through the two hinges 3. Additionally, the display unit 2 is attached to the body 1 so as to be turned about a line connecting between centers of the two hinges 3 as a central axis, and the display unit 2 is opened and closed with respect to the body 1 by the turning motion of the display unit 2. In the embodiment, an opening angle between the body 1 and the display unit 2 is 180 degrees or less, preferably about 120 to 140 degrees at the maximum.

The body 1 includes a palm rest unit 4 (keyboard unit) forming a portion of upper surface side (the side facing the display unit 2) and a body unit 5 forming a portion of a bottom surface side of the body 1. The body 1 is formed by fitting together the palm rest unit 4 and the body unit 5. The palm rest unit 4 and the body unit 5 each have plural members, however, prominent screws and so on are not formed on surfaces of outer packages of both units.

On the palm rest unit 4, operation elements such as a keyboard 6, a stick pointer 7 and a first click button 8 are provided. The stick pointer 7 is an operation element used when performing, for example, an operation of moving a cursor (pointer) displayed on a later-described display screen 10 or an operation of scrolling the display screen 10, which is provided in the vicinity of approximately the center of the palm rest unit 4.

On the body unit 5, for example, a printed board on which plural electronic components are mounted, a radiation unit and drives such as a hard disk drive are installed through not shown in FIG. 1. On the printed board, for example, a CPU, a memory and other electronic components are mounted.

An acceleration sensor used in later-described various gesture functions is mounted on the body unit 5 though not shown in FIG. 1. The acceleration sensor can be arranged in an optional position and can be provided, for example, in the display unit 2. When the acceleration sensor is mounted on the body unit 5, the position is set appropriately in consideration of the arrangement relation with respect to other electronic components mounted on the body unit 5. In the embodiment, the acceleration sensor is arranged, for example, in the vicinity of a portion under a key of a character "R".

The display unit 2 includes a casing 9, a display screen 10, a touch pad 11 and a second click button 12 which are provided on a surface of the casing 9 on a side facing the body 1 as well as a display processing unit (not shown) provided inside the casing 9, which performs given display processing.

The display screen 10 is a screen for displaying various kinds of information such as characters and images. The touch pad 11 is an operation element used when performing, for example, an operation of moving the cursor (pointer) displayed on the display screen 10 and an operation of scrolling the display screen 10, which uses a capacitance sensor in the embodiment.

[Internal Configuration of the Information Processing Apparatus]

Figure 2:
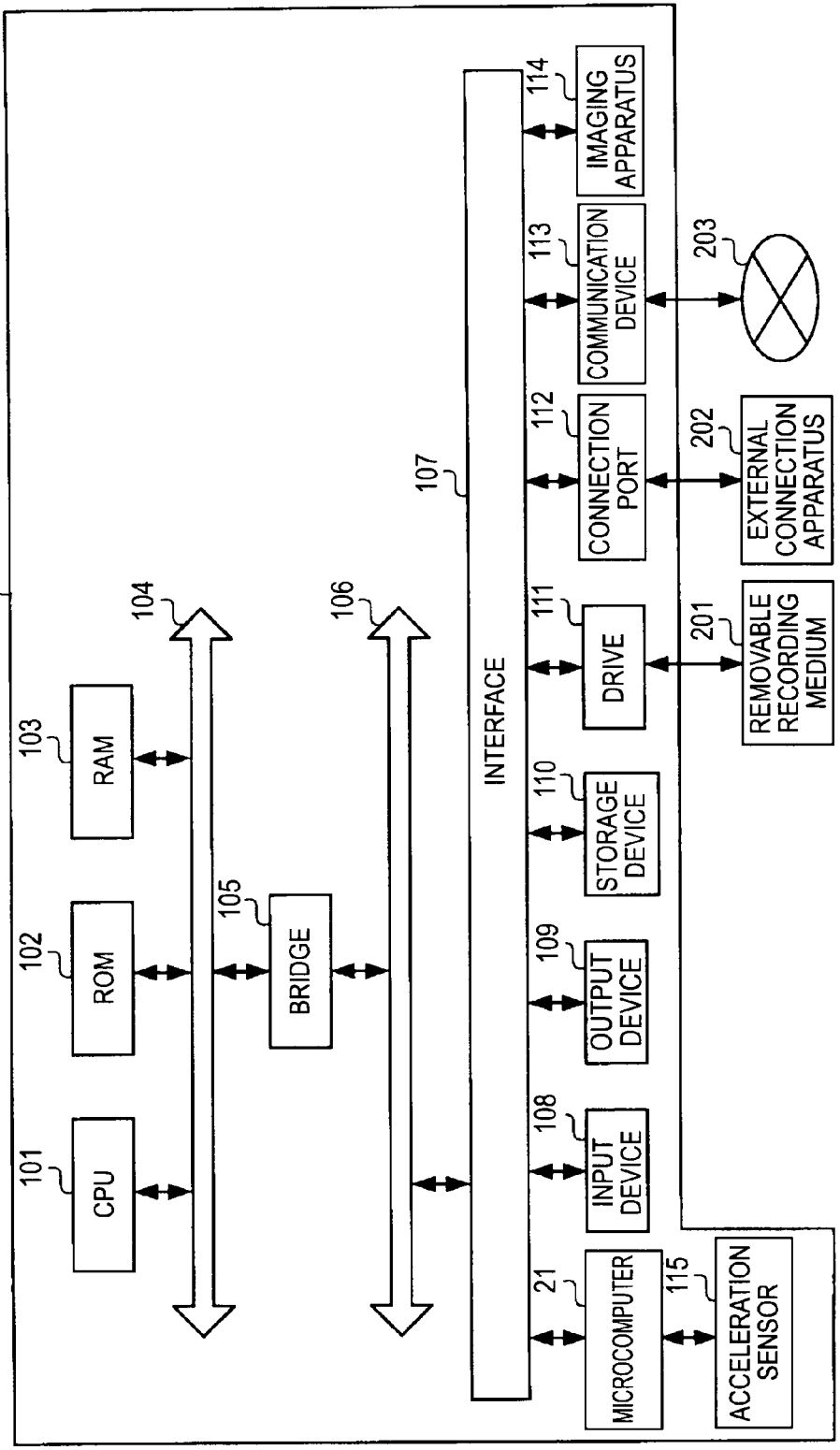
FIG. 2 is an internal block configuration diagram of the information processing apparatus according to the embodiment of the present technology.

Next, an internal configuration (hardware configuration) of the information processing apparatus 100 according to the embodiment will be explained with reference to FIG. 2. FIG. 2 is a block configuration diagram of hardware of the information processing apparatus 100.

The information processing apparatus 100 includes a CPU (Central Processing Unit) 101, a ROM (Read Only Memory) 102, a RAM (Random Access Memory) 103, a host bus 104, a bridge 105, an external bus 106 and an interface 107. The information processing apparatus 100 also includes an input device 108, an output device 109, a storage device 110, a drive 111, a connection port 112, a communication device 113 and an imaging apparatus 114. The information processing apparatus 100 further includes an acceleration sensor 115 and a microcomputer 21.

The CPU 101 (main CPU) functions as a calculation processing device and a control device. Specifically, the CPU 101 controls all or part of operations in the information processing apparatus 100 in accordance with various programs recorded in the ROM 102, the RAM 103, the storage device 110 or a removal recording medium 201 connected through the drive 111. The CPU 101 also controls execution processing of the later-described gesture function in the information processing apparatus 100 according to the embodiment.

The ROM 102 stores programs, calculation parameters and so on used in the CPU 101. The RAM 103 temporarily stores programs used when performing control processing in the CPU 101, parameters necessary for the execution of the processing and the like.

The CPU 101, the ROM 102 and the RAM 103 are connected to one another through the host bus 104 formed by an internal bus such as a CPU bus (not shown). Data such as the programs and the calculation parameters and so on is inputted/outputted among the CPU 101, the ROM 102 and the RAM 103 through the host bus 104. The host bus 104 is connected to the external bus 106 such as a PCI (Peripheral Component Interconnect/Interface) bus through the bridge 105.

The input device 108 includes operation means used by the user which are for example, a mouse, a keyboard, a touch panel, buttons, switches and levers. That is, the stick pointer 7 and the first click button 8 provided in the body 1 as well as the touch pad 11 and the second click button 12 provided in the display unit 2 are included in the input device 108. The input device 108 may include a remote control device (namely, a remote controller) using infrared rays or other electric waves. The input device 108 may further include input functions which can be directly operated from an external connection apparatus 202 such as a cellular phone and a PDA (Personal Digital Assistants).

The input device 108 also includes, for example, an input control circuit generating an operation signal corresponding to operation executed by the user by using the above respective operation means and outputting the generated operation signal to the CPU 101. The CPU 101 executes processing corresponding to the operation performed by the user based on the operation signal outputted from the input device 108.

The output device 109 includes a display device capable of notifying the user of acquired information visually, an audio output device capable of notifying the information acoustically. That is, the display screen 10 provided on the display unit 2 is included in the output device 109. As the display device, for example, a CRT (Cathode-Ray Tube) display device, a liquid crystal display device, a plasma display device, an EL (Electro-Luminescence) display device, a lamp and so on can be used. The audio output device includes, for example, a speaker, headphones and so on. The output device 109 may include, for example, a printer device, a cellular phone, a facsimile and so on.

The output device 109 outputs results obtained by various processing performed by the information processing apparatus 100. Specifically, each of various display devices included in the output device 109 displays results obtained by various processing performed by the information processing apparatus 100 as text or images. Each of various audio output devices included in the output device 109 converts audio signals including reproduced audio data, acoustic data and the like into analog signals and outputs the signals.

The storage device 110 is a device for storing data, including, for example, a magnetic storage device such as an HDD (Hard Disk Drive) and the like, a semiconductor storage device, an optical storage device, a magneto-optical storage device and the like. The storage device 110 stores programs to be executed by the CPU 101 and various data as well as acoustic signal data, image signal data acquired from the outside and so on.

The drive 111 is a reader/writer for the recording medium. FIG. 2 shows an example in which the drive 111 is included the information processing apparatus 100, however, the present technology is not limited to this and a configuration in which the drive 111 is installed outside the information processing apparatus 100 can be applied. The drive 111 reads given information recorded in a mounted removable recording medium 201 and outputs the information to the RAM 103. The drive 111 can also write information into the mounted removable recording medium 201.

The removable recording medium 201 includes, for example, a magnetic disk, an optical disk, a magneto-optical disk, a semiconductor memory and so on. More specifically, the removable recording medium 201 includes, for example, a DVD (Digital Versatile Disc), a BD (Blu-ray Disc: Trademark), CompactFlash (Trademark) card, a memory stick, a SD (Secure Digital) memory card and so on. The removable recording medium 201 may also be an IC card mounting a non-contact IC (Integrated Circuit) chip, an external electronic apparatus and so on.

The connection port 112 is a port for directly connecting an external apparatus to the information processing apparatus 100, including for example, a USB (Universal Serial Bus) port, an IEEE 1394 port such as i-Link, a SCSI (Small Computer System Interface) port and so on. The connection port 112 further includes a RS-232C port, an optical audio terminal, an HDMI (High-Definition Multimedia Interface) port and so on. When the external connection apparatus 202 is connected to the connection port 112, the information processing apparatus 100 can acquire acoustic signal data and image signal data directly from the external connection apparatus 202 as well as can provide acoustic signal data and image signal data to the external connection apparatus 202.

The communication device 113 is a communication interface including a communication device and the like necessary when connecting the information processing apparatus 100 to, for example, a network 203. The communication device 113 includes a communication card for wired or wireless LAN (Local Area Network), Bluetooth or for WUSB (Wireless USB). The communication device 113 also includes an optical communication router, an ADSL (Asymmetric Digital Subscriber Line) router, modems for various types of communication. The information processing apparatus 100 can transmit/receive given information to/from Internet or other communication apparatuses through the communication device 113. The network 203 is a network connected to the communication device 113 through wire or wireless, including for example, Internet, a home LAN, an infrared communication network, a radio-wave communication network, a satellite communication network and so on.

The imaging apparatus 114 includes, through not shown, an imaging optical system and an imaging device. Incident light (image light) from a subject is taken by the imaging optical system and the image light is imaged on the imaging device. Then, the imaging device converts the light amount of the imaged incident light into electric signals (photoelectric conversion) to thereby acquire a taken image. The taken image acquired from the imaging device may be moving images acquired in time series as well as a still image acquired at one time point. The imaging device includes, for example, a CCD (Charge Coupled Device) type image sensor and a MOS (Metal-Oxide Semiconductor) type image sensor.

The acceleration sensor 115 detects information (acceleration) concerning posture (inclination) of the apparatus body 100*a*. In the embodiment, a triaxial acceleration sensor is used as the acceleration sensor 115, and inclination of the apparatus body 101*a* is calculated based on acceleration (gravitational acceleration) components in respective axis directions detected by the acceleration sensor 115. In the embodiment, as shown in FIG. 1, an X-axis direction of the acceleration sensor 115 is a longitudinal direction of the body 1, a Y-axis direction is a short-side direction of the body 1 and a Z-axis direction is a direction orthogonal to the surface on which the keyboard 6 is formed.

The microcomputer 21 performs processing of keyboard control, power supply control and so on in the same manner as the related-art notebook PC. In the embodiment, the microcomputer 21 (a gesture motion determination unit) is connected to the acceleration censor 115, acquiring acceleration data in respective axis directions detected by the acceleration sensor 115 and performing various types of determination processing of the gesture function based on the acquired acceleration data. Specifically, the microcomputer 21 performs discrimination of a reference posture of a holding state of the information processing apparatus 100 and determination of a gesture motion executed by the user according to the later-described operation principles of the gesture function using acceleration data of directions of respective axis directions detected by the acceleration sensor 115. The execution processing of an operation corresponding to the gesture motion determined by the microcomputer 21 is performed by a later-described operation execution unit 22 in the CPU 101.

The microcomputer 21 initializes various operation settings of the acceleration sensor 115 at the time of executing the gesture function. The microcomputer 21 further notifies the later-described operation execution unit 22 in the CPU 101 of the execution at the time of executing the gesture function. The microcomputer 21 includes a ROM (not shown) in which, for example, data such as various threshold values used for gesture determination, initialization setting values of the acceleration sensor 115 and so on are stored.

In the embodiment, as described later, calculation processing, a processing algorithm and so on performed by the microcomputer 21 at the time of determining the gesture motion can be made simpler. Therefore, when the microcomputer 21 for performing processing such as keyboard control and the power supply control which is mounted on the notebook PC from the past is burdened with various processing of the gesture function, the smooth gesture function can be realized.

The above internal configuration (hardware configuration) of the information processing apparatus 100 is an example, which may configure respective components by using general-purpose members as well as may configure the components by hardware specialized to functions corresponding to respective components. Therefore, it is possible to appropriately change the hardware configuration to be used according to technical levels at the time of carrying out the embodiment.

<2. Processing Blocks of a Gesture Function>

Figure 3:
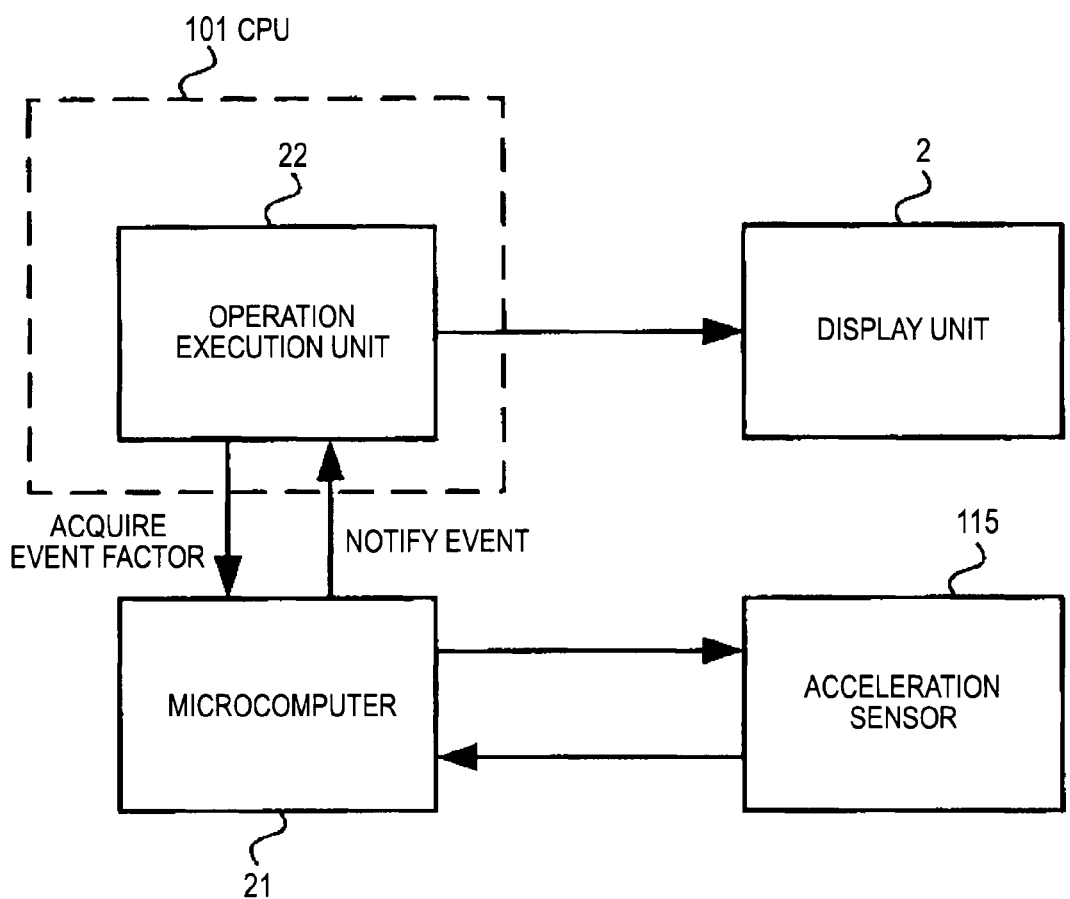
FIG. 3 is a configuration diagram of processing blocks of a gesture function according to the embodiment of the present technology.

Next, a configuration of a processing unit for executing the gesture function in the information processing apparatus 100 according to the embodiment will be explained with reference to FIG. 3. FIG. 3 is a block configuration diagram of a processing system necessary when performing various types of operations in the gesture function. FIG. 3 only shows the processing system necessary for executing the gesture function and other configurations are omitted.

The processing unit for executing the gesture function includes the microcomputer 21 and the operation execution unit 22 included in the CPU 101.

The operation execution unit 22 receives notification indicating that a given gesture motion has been performed from the microcomputer 21 and acquires information for determining the gesture (hereinafter, referred to as an event factor) from the microcomputer 21. Then, the operation execution unit 22 executes processing corresponding to the discriminated gesture motion based on the acquired event factor. For example, page turning of the display screen 10 is cited as an example of the gesture function, the operation execution unit 22 controls the display unit 2 to turn a page of the display screen 10 in a given direction when receiving notification indicating that the given gesture motion has been performed from the microcomputer 21.

The operation execution unit 22 does not perform the above processing until receiving notification indicating that the gesture has been performed from the microcomputer 21. Therefore, the operation execution unit 22 is configured as an upper layer of the microcomputer 21 in a processing flow of the CPU 101. However, the present technology is not limited to this and the microcomputer 21 may be integrally configured with the operation execution unit 22.

The operation execution unit 22 also executes not only processing of the gesture function but also operation processing corresponding to other functions.

<3. An Outline and Operation Principles of the Gesture Function>

[Outline of the Gesture Function]

Next, an outline of the gesture function which can be executed in the information processing apparatus 100 according to the embodiment will be briefly explained. As miniaturization of the notebook PC progresses, there are plural manners of holding the notebook PC when it is used. In this case, it is necessary that the gesture function also respond to various holding manners. In the embodiment, an example of the information processing apparatus 100 which can realize the gesture function in two types of holding manners will be explained.

Figure 4:
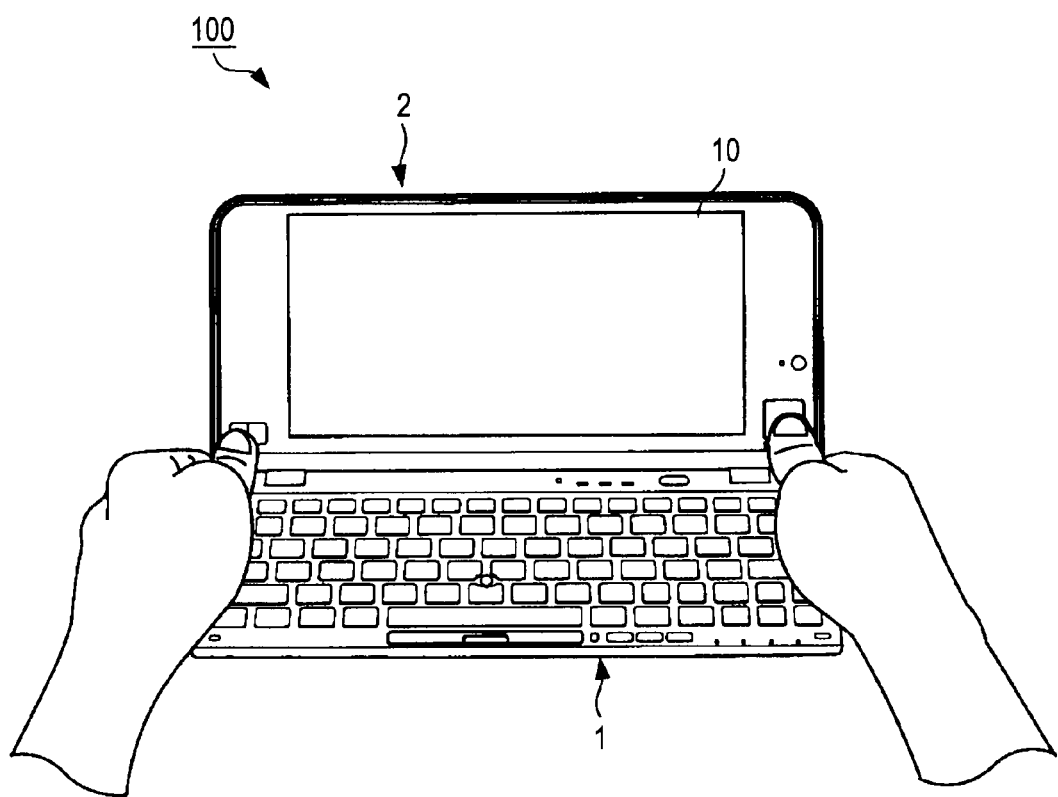
FIG. 4 is a view showing a state in which the information processing apparatus is held in a horizontal position.
Figure 5:
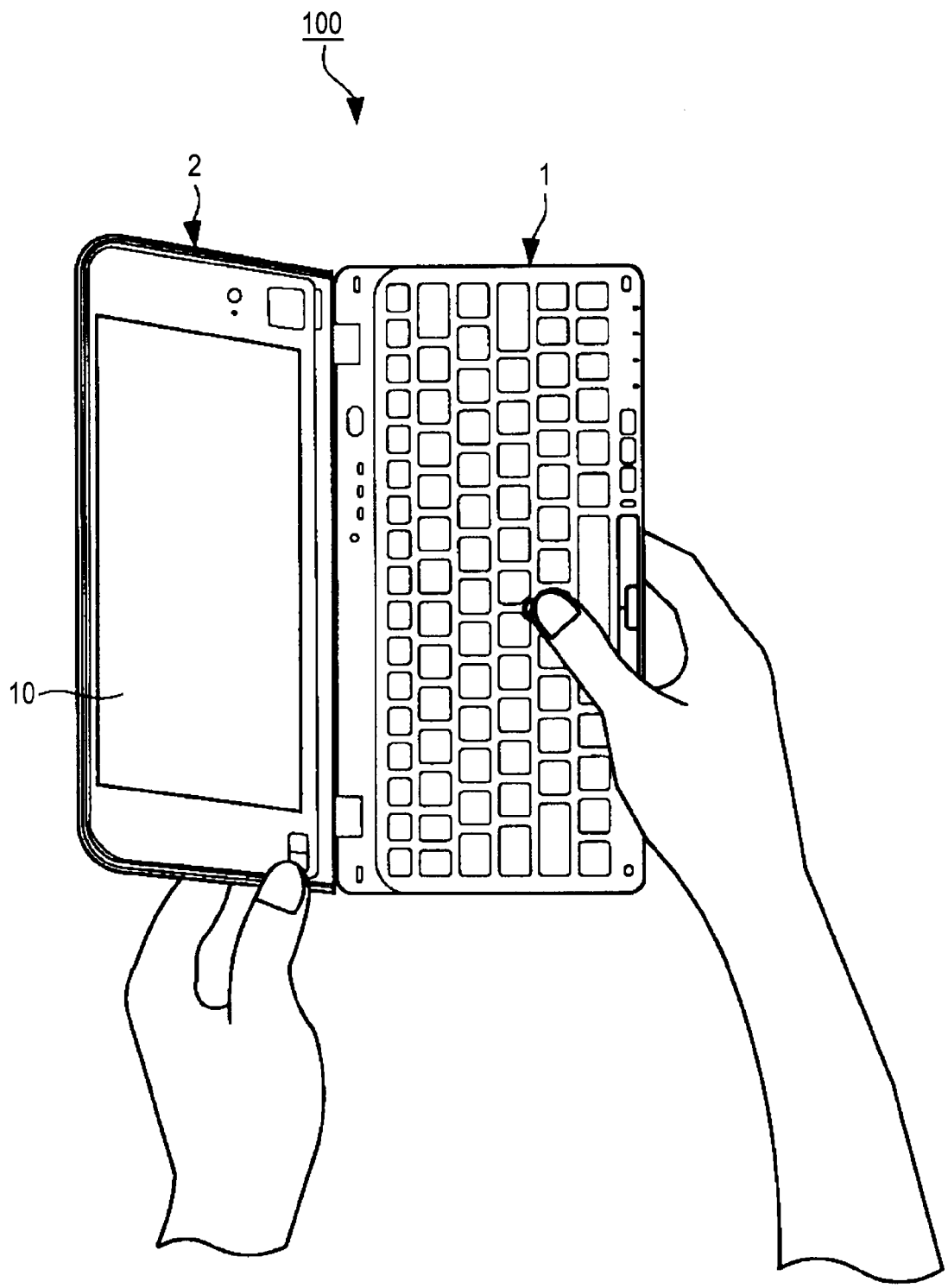
FIG. 5 is a view showing a state in which the information processing apparatus is held in a vertical position.

The two types of holding manners will be shown in FIG. 4 and FIG. 5. FIG. 4 is a view showing a state in which one short-side end (right side in FIG. 4) and the other short-side end of the body 1 of the information processing apparatus 100 are held by a right hand and a left hand respectively (hereinafter, the holding state is referred to as a horizontal position). On the other hand, FIG. 5 shows a state in which the information processing apparatus 100 is held in a manner of turning the apparatus 90 degrees from the state of the horizontal position (hereinafter, the holding state is referred to as a vertical position).

In the embodiment, an example of the gesture function will be explained, in which a given operation such as a page turning of the display page is executed by inclining (flicking) the information processing apparatus 100 in a given direction in holding postures of the information processing apparatus 100 shown in FIG. 4 and FIG. 5. In the embodiment, when the information processing apparatus 100 is turned 90 degrees from the state of the horizontal position, a display image displayed on the display screen is set to be also turned 90 degrees. The turning processing is performed by the CPU 101 based on a signal detected by the acceleration sensor 115.

[Operation Principles of the Gesture Function]

In the embodiment, a reference posture of the holding state shown in FIG. 4 or FIG. 5 is determined based on acceleration components of respective axes obtained by the acceleration sensor 115 as well as a posture change (inclination) of the information processing apparatus 100 from the reference posture is discriminated. Then, the information processing apparatus 100 executes the gesture function corresponding to the discrimination result. Hereinafter, operation principles of the gesture function in the holding postures in the horizontal position and the vertical position will be explained in detail with reference to the drawings.

(1) The Gesture Function in the Holding Posture of the Horizontal Position

Operation principles used when a user executes the gesture function while holding the information processing apparatus 100 in the horizontal position as shown in FIG. 4 will be explained with reference to FIGS. 6A and 6B and FIGS. 7A and 7B.

Figure 6A:
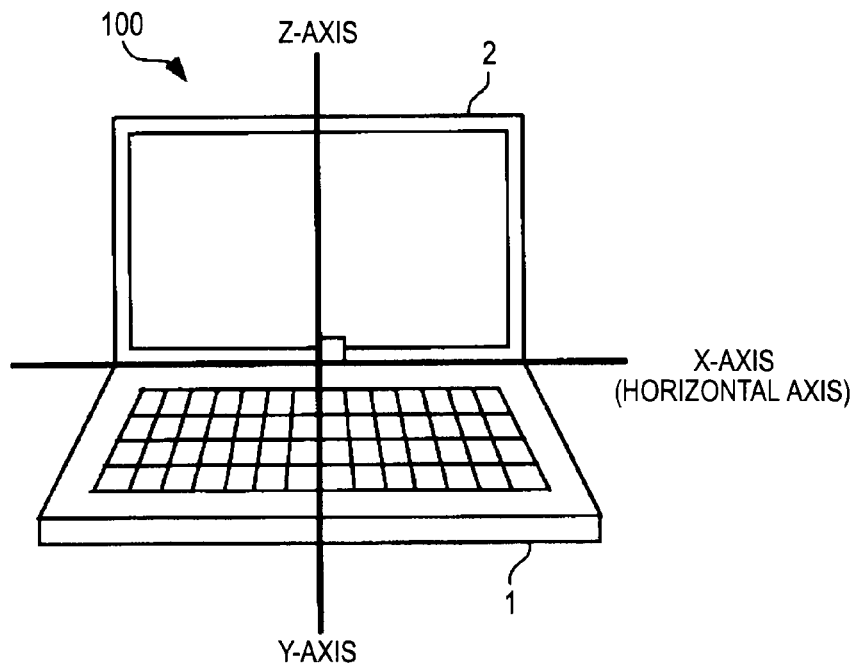
FIGS. 6A and 6B are views for explaining principles for determining a gesture motion at the time of holding the information processing apparatus in the horizontal position.
Figure 6B:
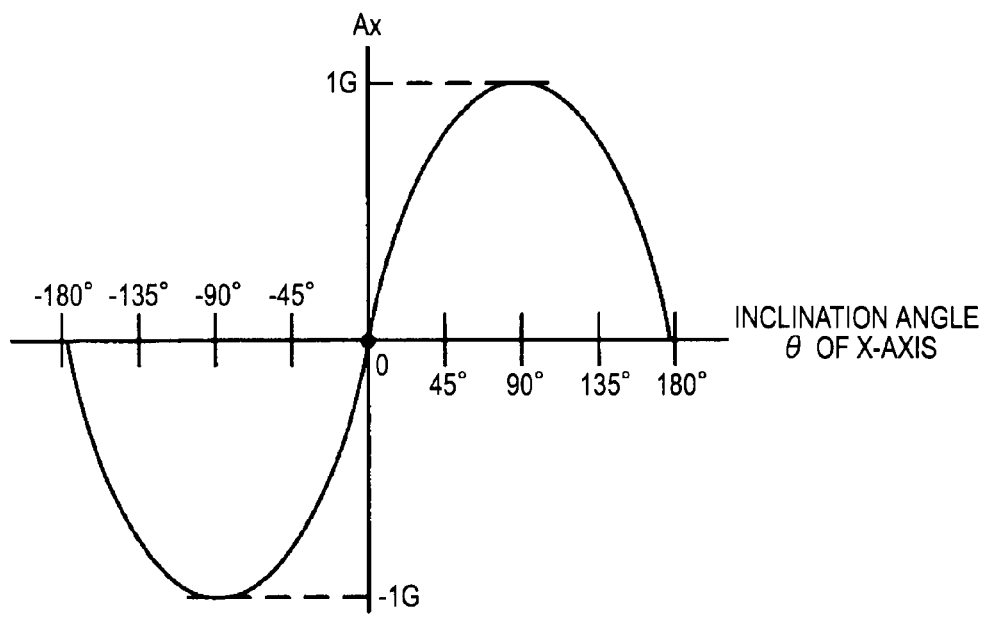
Figure 7A:
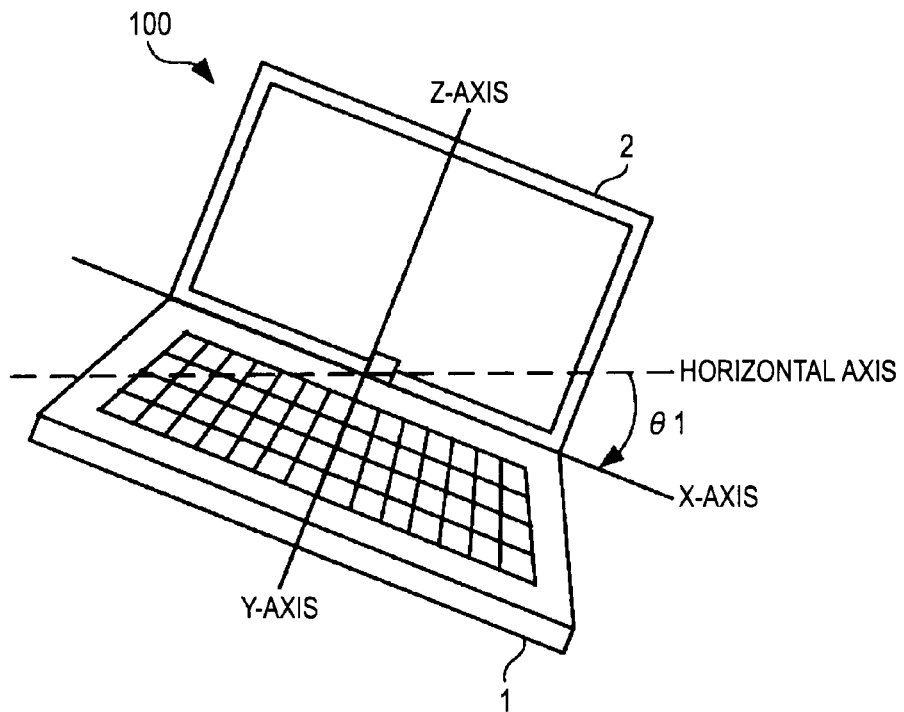
FIGS. 7A and 7B are views for explaining principles for determining a gesture motion at the time of holding the information processing apparatus in the horizontal position.
Figure 7B:
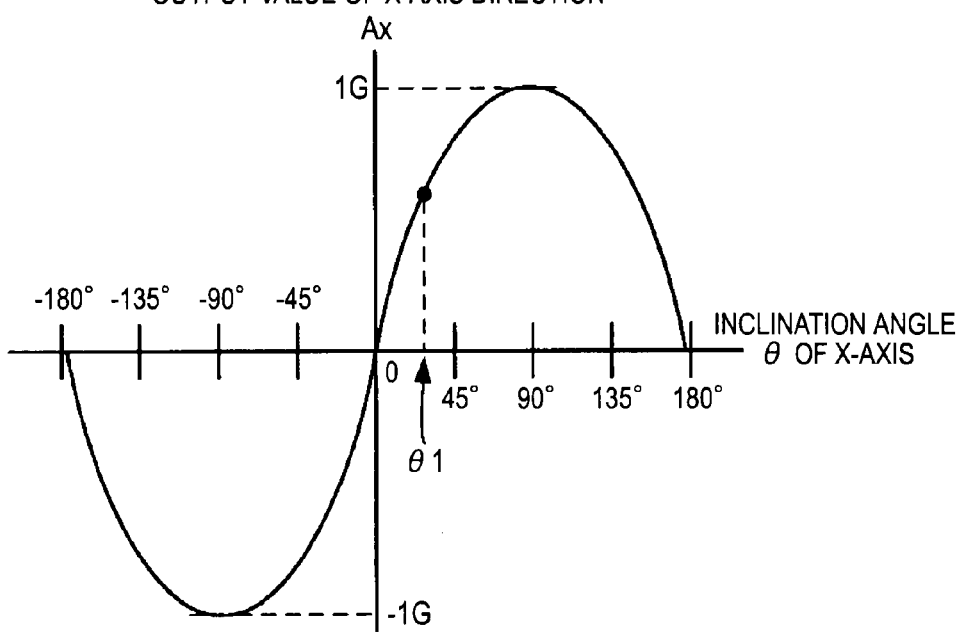

FIG. 6A is an elevation view of the information processing apparatus 100 showing a reference posture at the time of executing the gesture function while holding the information processing apparatus 100 in the horizontal position. FIG. 6B is a characteristic graph showing variation of an acceleration Ax in the X-axis direction outputted from the acceleration sensor 115 with respect to inclination from the reference posture of the information processing apparatus 100 in the horizontal position, in which the horizontal axis denotes inclination angles θ from the reference posture of the X-axis direction and the vertical axis denotes acceleration Ax in the X-axis direction. FIG. 7A is an elevation view showing a holding state of the information processing apparatus 100 after the gesture function has been performed while holding the information processing apparatus 100 in the horizontal position. FIG. 7B is a characteristic graph showing variation of acceleration Ax of the X-axis direction outputted from the acceleration sensor 115 with respect to inclination from the reference posture of the information processing apparatus 100, in which the horizontal axis denotes the inclination angles θ from the reference posture of the X-axis direction and the vertical axis denotes acceleration Ax of the X-axis direction.

As shown in FIG. 6B and FIG. 7B, in the embodiment, acceleration of respective axis directions outputted from the acceleration sensor 115 is obtained by using the acceleration sensor 115 in which acceleration varies in a sinusoidal pattern in accordance with inclination of respective axes. In FIG. 6A and FIG. 7A, user's hands holding the information processing apparatus 100 are not shown for simplifying the explanation.

When the user holds the information processing apparatus 100 in the reference posture of the horizontal position, as shown in FIG. 6A, the X-axis of the acceleration sensor 115 almost corresponds to an axis of the horizontal direction (hereinafter referred to as a horizontal axis), therefore, a determination axis for the gesture function in this case is the X-axis. Then, in the embodiment, the inclination direction from the reference posture of the X-axis in the horizontal position is calculated to execute the given gesture function.

In the gesture function in the holding posture of the horizontal position, when the user holds the information processing apparatus 100 (device body 100a) in the reference posture first, the X-axis direction almost corresponds to the horizontal direction as shown in FIG. 6A. In this case, the acceleration Ax in the X-axis direction outputted from the acceleration sensor 115 is approximately zero (refer to a black spot in FIG. 6B).

Next, when the user inclines the X-axis of the acceleration sensor 115 by turning the information processing apparatus 100 clockwise by an angle θ1 from the reference posture (horizontal axis) in a surface facing the user as shown in FIG. 7A. The acceleration Ax in the X-axis direction outputted from the acceleration sensor 115 will be a positive acceleration value corresponding to the inclination angle θ1 from the horizontal axis of the X-axis (refer to a black spot in FIG. 7B) by the inclination motion (gesture motion) as shown in FIG. 7B. When the user turns the information processing apparatus 100 counterclockwise from the reference posture in the surface facing the user, the acceleration Ax in the X-axis direction outputted from the acceleration sensor 115 will be a negative acceleration value, though not shown.

Then, the microcomputer 21 determines the user's gesture (inclination motion in the clockwise direction or inclination motion in the counterclockwise direction) by comparing the acceleration Ax in the X-axis direction outputted from the acceleration sensor 115 with a given threshold value and the operation execution unit 22 executes processing corresponding to the gesture. In the embodiment, two kinds of threshold values are prepared, which are a threshold value (positive value) obtained when the information processing apparatus 100 inclines clockwise (right-turn direction) in the surface facing the user and a threshold value (negative value) obtained when the information processing apparatus 100 is inclined counterclockwise (left-turn direction).

Here, the page turning of the display screen 10 is cited as an example of the gesture function performed while the information processing apparatus 100 is held in the horizontal position, and an operation example thereof will be briefly explained. For example, when the user inclines the information processing apparatus 100 clockwise from the reference posture of the horizontal position, the gesture of the user is determined by the microcomputer 21 and an image of the next page is displayed. Conversely, when the user inclines the information processing apparatus 100 counterclockwise from the reference posture of the horizontal position, the gesture of the user is determined by the microcomputer 21 and an image of the previous page is displayed.

(2) The Gesture Function in the Holding Posture of the Vertical Position

Operational principles used when the user executes the gesture function while holding the information processing apparatus 100 in the vertical position as shown in FIG. 5 will be explained with reference to the drawings. In the embodiment, the gesture motion performed when the gesture function is executed while holding the information processing apparatus 100 in the vertical position is a turning motion about the X-axis of the acceleration sensor 115 as a central axis.

When the gesture function is executed while holding the information processing apparatus 100 in the vertical position, it is assumed that the function is normally executed in a state in which the surface facing the user on the side on which the keyboard is formed in the information processing apparatus 100 is fully opened. Therefore, in the operation principles of the gesture function in the vertical position to be explained below, the motion performed when the surface facing the user on the side on which the keyboard is formed in the information processing apparatus 100 is fully opened, namely, when the opening angle between the body 1 and the display unit 2 is the maximum will be explained.

Figure 8A:
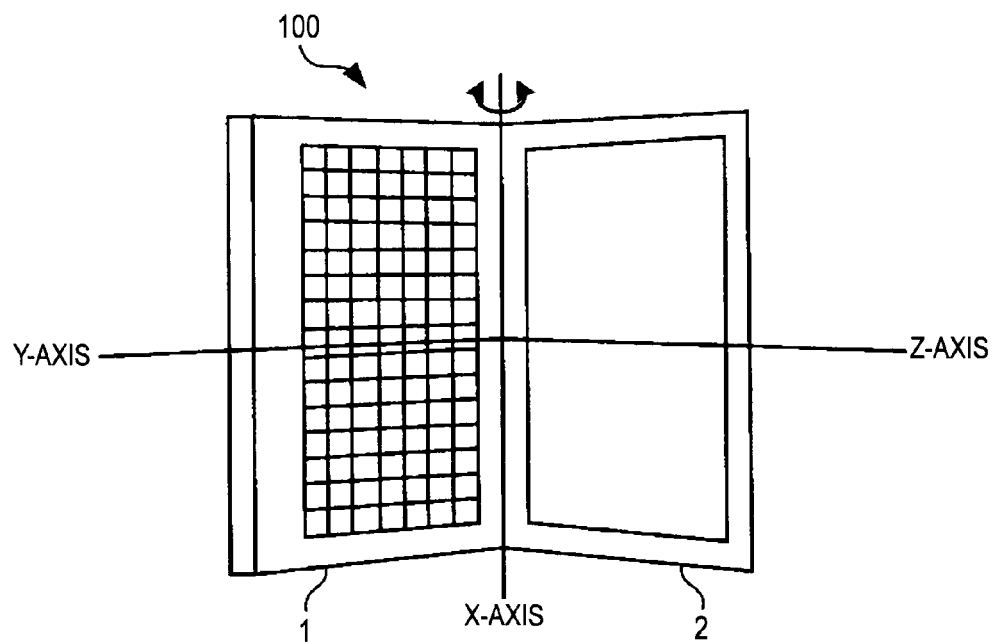
FIGS. 8A and 8B are views showing reference postures at the time of holding the information processing apparatus in the vertical position.
Figure 8B:
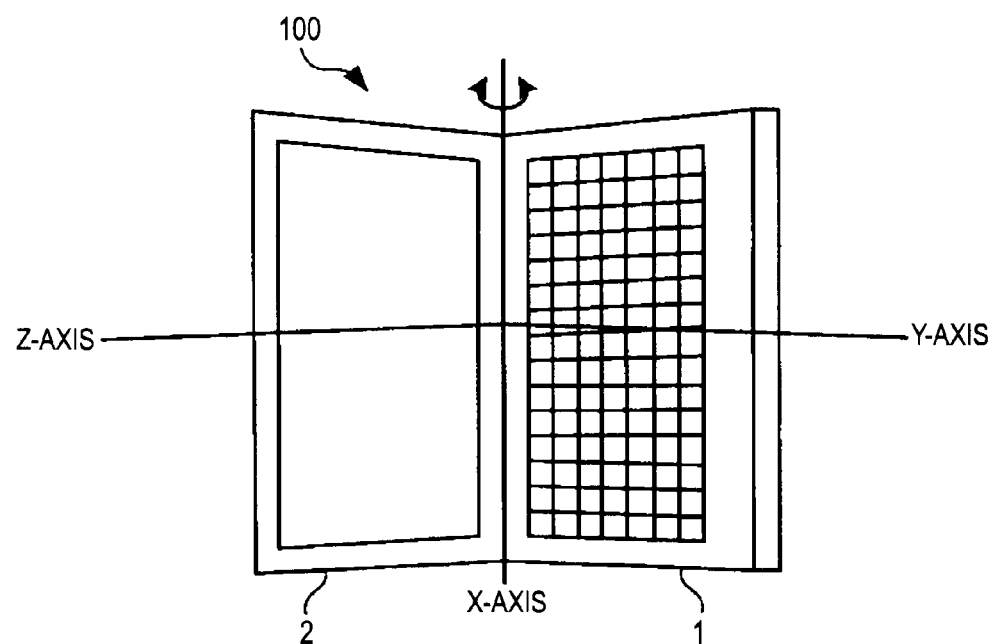

When the information processing apparatus 100 is held in the vertical position, there are two kinds of reference postures. The holding examples are shown in FIGS. 8A and 8B. FIGS. 8A and 8B are elevation views seen from user's side when the user holds the information processing apparatus 100 in the reference postures of the vertical position. In FIGS. 8A and 8B, user's hands holding the information processing apparatus 100 are not shown for simplifying the explanation.

When the information processing apparatus 100 is held in the vertical position, there is a case in which the apparatus is held so that the display unit 2 is positioned on the right side of the body 1 seen from the user's side as shown in FIG. 8A and a case in which the apparatus is held so that the display unit 2 is positioned on the left side of the body 1 seen from the user's side as shown in FIG. 8B. As the gesture function can be executed in the same principles in either posture of the vertical position in the embodiment, only the operation principles of the gesture function in the holding posture of the vertical position shown in FIG. 8A will be explained in detail.

Figure 9A:
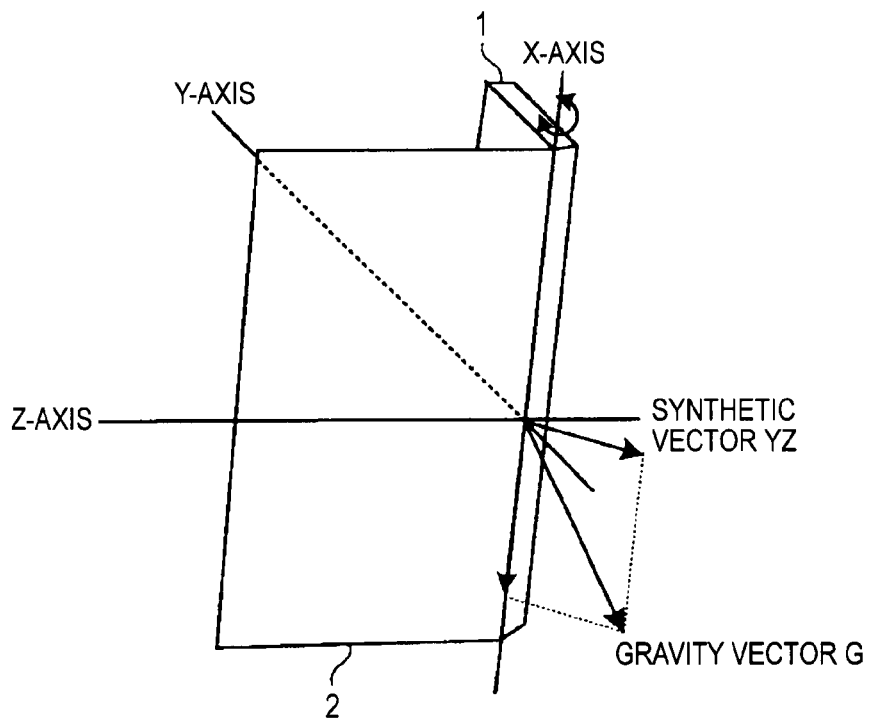
FIGS. 9A and 9B are views for explaining a synthetic acceleration vector in a Y-Z plane defined by a Y-axis and a Z-axis of the acceleration sensor.
Figure 9B:
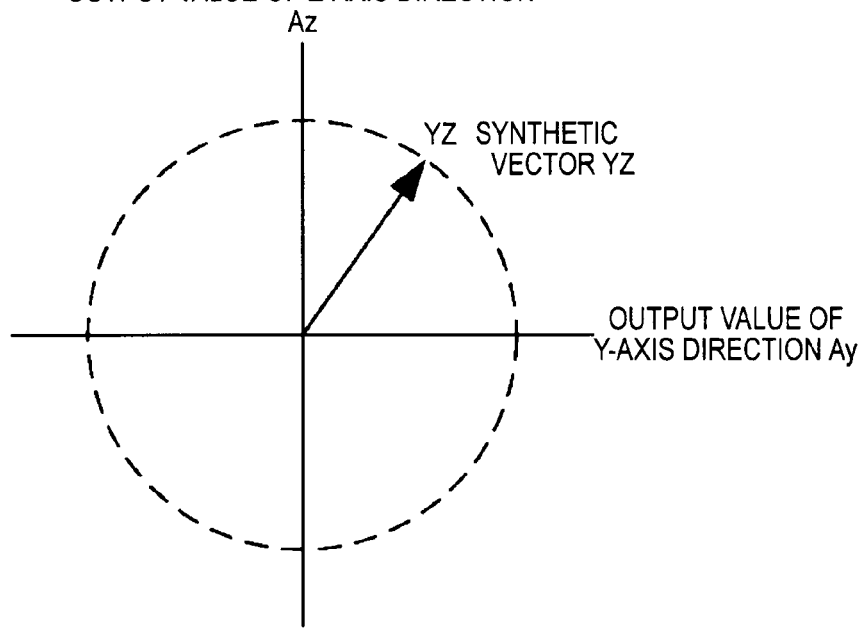

FIGS. 9A and 9B show the relation of vectors of acceleration components in respective axis directions of the acceleration sensor 115 obtained when the information processing apparatus 100 is held in the vertical position. FIG. 9A is a back perspective view showing a state in which the user holds the information processing apparatus 100 in the vertical position. FIG. 9B is a view showing the relation between an acceleration Ay in the Y-axis direction, an acceleration Az in the Z-axis direction outputted from the acceleration sensor 115 and a synthetic vector YZ obtained by synthesizing an acceleration vector "y" in the Y-axis direction with an acceleration vector "z" in the Z-axis direction. In FIG. 9B, the horizontal axis denotes the acceleration Ay in the Y-axis direction and the vertical axis denotes the acceleration Az in the Z-axis direction.

In the embodiment, the gesture motion to be performed when the gesture function is executed while holding the information processing apparatus 100 in the vertical position is the turning motion about the X-axis as the central axis, therefore, the acceleration Ax in the X-axis direction does not vary. A vector synthesized by the acceleration vectors in the X-axis, Y-axis and Z-axis directions obtained by the acceleration sensor 115 corresponds to a gravity vector G as shown in FIG. 9A. Accordingly, the size of the synthetic vector YZ obtained by synthesizing the acceleration vector "y" in the Y-axis direction with the acceleration vector "z" in the Z-axis direction of the acceleration sensor 115 will be constant regardless of the turning amount and the turning direction of the information processing apparatus 100 with respect to the X-axis. As a result, a trace of the synthetic vector YZ will be a circular trace as shown in a dashed line in FIG. 9B. This indicates that the gesture motion can be discriminated by change of inclination of one determination axis also when the information processing apparatus 100 is held in the vertical position.

Figure 10A:
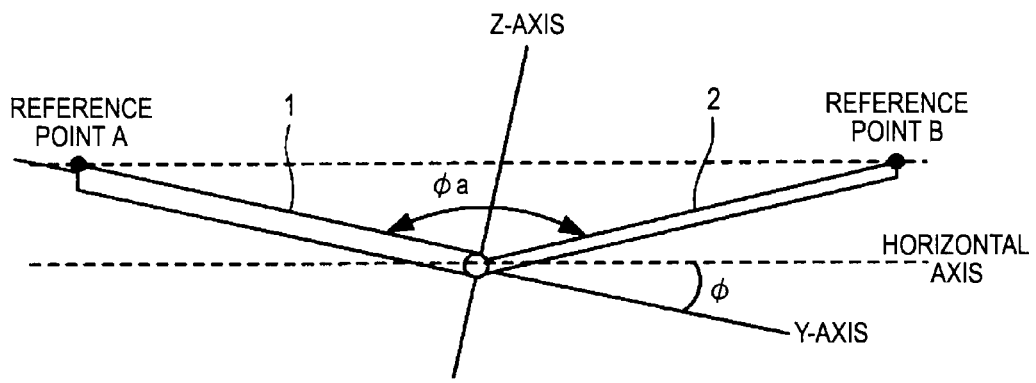
FIGS. 10A and 10B are views for explaining setting principles of a virtual axis.
Figure 10B:
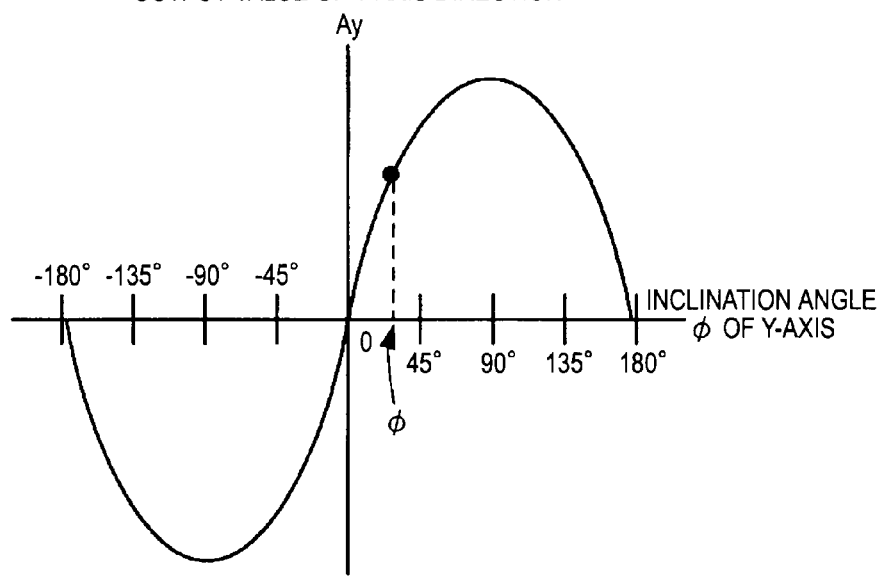

Here, FIGS. 10A and 10B show a bottom view showing a state in which the user holds the information processing apparatus 100 in the reference posture of the vertical position and characteristics of the acceleration Ay in the Y-axis direction outputted from the acceleration sensor 115, respectively. The horizontal axis in characteristics shown in FIG. 10B denotes inclination angles φ from the horizontal axis of the Y-axis and the vertical axis denotes acceleration Ay in the Y-axis direction.

When the user holds the information processing apparatus 100 in the reference posture of the vertical position, normally, an angle between the horizontal axis and the axis of the short-side direction (Y-axis) of the body 1 approximately corresponds to an angle between the horizontal axis and the axis of the short-side direction of the display unit 2 as shown in FIG. 10A. That is, in the state in which the user holds the information processing apparatus 100 in the reference posture of the vertical position, the body 1 and the display unit 2 normally incline almost symmetrically with respect to the direction orthogonal to the horizontal direction. The angle φ between the horizontal axis and the Y-axis can be calculated in advance from the maximum opening angle φa between the body 1 and the display unit 2. For example, when the maximum opening angle (φa between the body 1 and the display unit 2 is approximately 120 to 140 degrees, the angle φ between the horizontal axis and the Y-axis is approximately 20 to 30 degrees.

In the embodiment, the gesture is discriminated by determining the inclination of the information processing apparatus 100 from the reference posture of the vertical position shown in FIG. 10A toward the turning direction about the X-axis as the central axis. However, the Y-axis of the acceleration sensor 115 inclines with respect to the horizontal axis by the angle φ in the reference posture of the vertical position shown in FIG. 10A, therefore, the acceleration Ay of the Y-axis direction does not become approximately zero as shown by a black spot in FIG. 10B. Accordingly, in this case, it is necessary to determine the inclination by subtracting an acceleration value corresponding to the angle φ from the acceleration Ay in the Y-axis direction so that the acceleration Ay in the Y-axis direction becomes approximately zero in the reference posture shown in FIG. 10A.

However, in the embodiment, a virtual axis in a direction parallel to the horizontal axis (horizontal direction) is set anew as a determination axis for excluding such additional calculation, and the inclination direction of the virtual axis is determined to discriminate the gesture motion. In the example shown in FIG. 10A, the virtual axis is set to a direction of a segment connecting a given reference point A at a long-side end on the opposite side of the display unit 2 side in the body 1 to a reference point B at a long-side end on the opposite side of the body 1 in the display unit 2 in the same Y-Z plane. That is, in the embodiment, the virtual axis parallel to the horizontal direction is set in the surface orthogonal to the X-axis (Y-Z plane). When the virtual axis is set in this manner, the acceleration on the virtual axis will be approximately zero in the reference posture of the vertical position.

Figure 11:
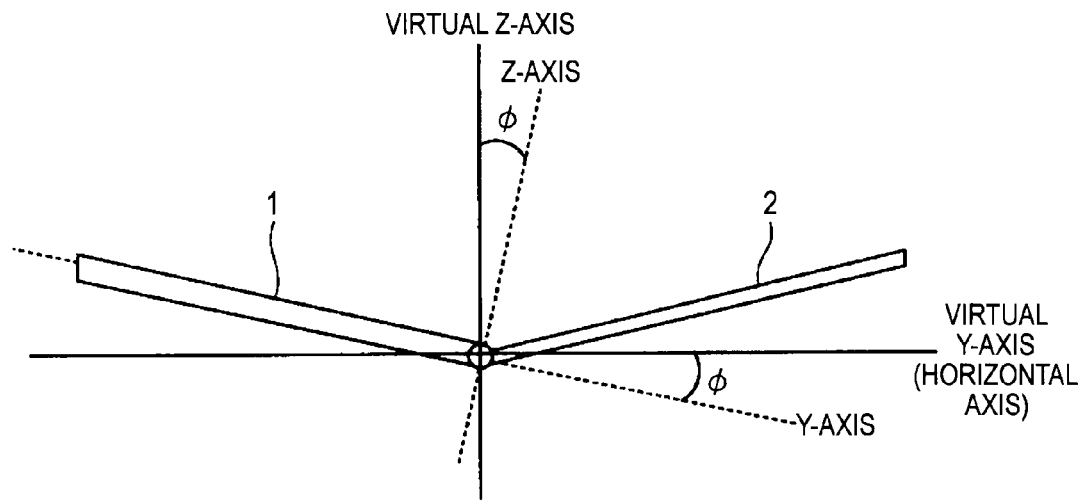
FIG. 11 is a view for explaining setting principles of the virtual axis.

Hereinafter, the virtual axis in the direction of the segment connecting the reference point A to the reference point B in FIG. 10A is referred to as a virtual Y-axis. In the embodiment, a virtual axis orthogonal to the horizontal surface including the horizontal axis in the vertical position shown in FIG. 10A is referred to as a virtual Z-axis. FIG. 11 shows the relation between the virtual Y-axis and the virtual Z-axis. As shown in FIG. 11, the virtual Y-axis is parallel to the horizontal axis and the virtual Y-axis is orthogonal to the virtual Z-axis.

Figure 12:
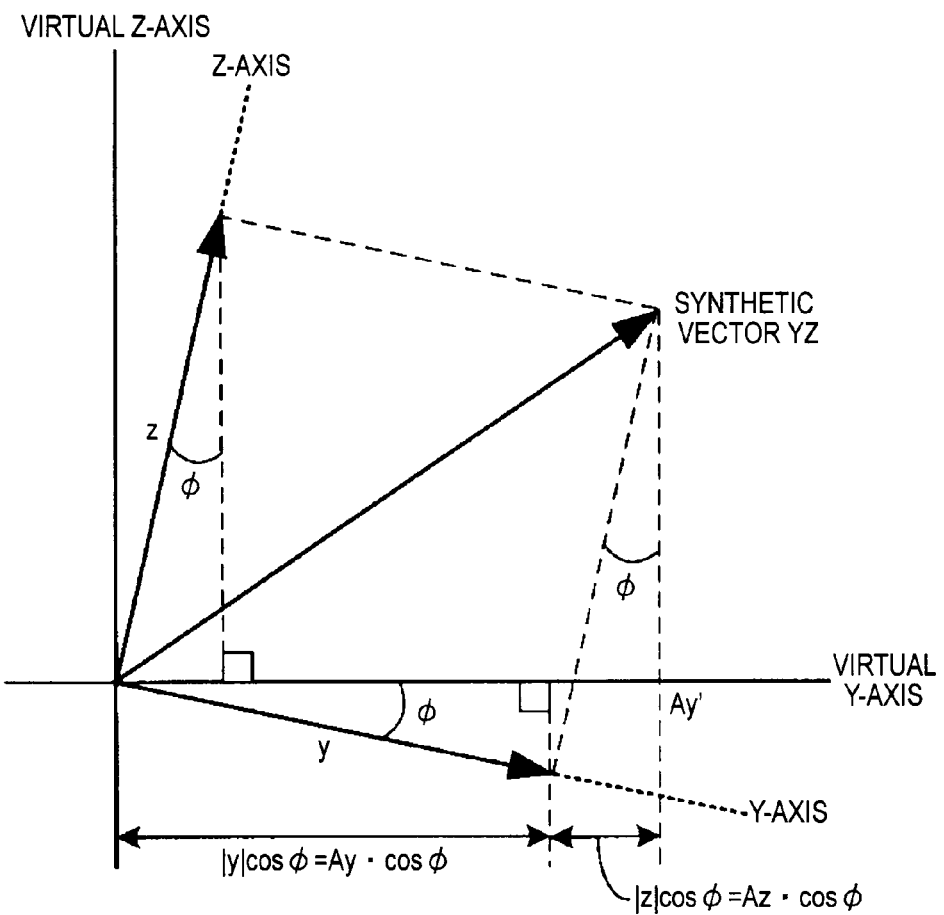
FIG. 12 is a view for explaining setting principles of the virtual axis.

FIG. 12 shows the relation between the acceleration Ay in the Y-axis direction, the acceleration Az in the Z-axis direction outputted from the acceleration sensor 115 and an acceleration Ay' obtained on the virtual Y-axis. In FIG. 12, the vector "y" is the acceleration vector in the Y-axis direction from the acceleration sensor 115, the vector "z" is the acceleration vector in the Z-axis direction, and the synthetic vector YZ is a synthetic vector obtained by synthesizing the vector "y" with the vector "z". When the sizes (absolute values) of the vector "y" and the vector "z" are Ay, Az respectively and an angle between the virtual Y-axis (horizontal axis) and the Y-axis is in the reference posture is φ, the acceleration Ay' obtained on the virtual Y-axis is calculated by the following expression (1).

$$Ay' = Ay \cdot \cos \phi + Az \cdot \sin \phi \qquad (1)$$

In the above expression (1), the accelerations Ay, Az vary according to the gesture motion from the reference posture. However, the angle φ in the above expression (1) is a parameter calculated in advance from the maximum opening angle φa (known) between the body 1 and the display unit 2 as described above, which does not vary according to the gesture motion. That is, cos φ and sin φ in the above expression (1) can be dealt as constants in the embodiment. As it is not necessary to perform trigonometric function calculation when calculating the acceleration Ay' obtained on the virtual Y-axis, the calculation processing can be simplified and load of the calculation processing in the microcomputer 21 can be reduced.

Next, the operation principles used when the user performs the gesture function while holding the information processing apparatus 100 in the vertical position as shown in FIG. 8A will be specifically explained with reference to FIGS. 13A and 13B and FIGS. 14A and 14B.

Figure 13A:
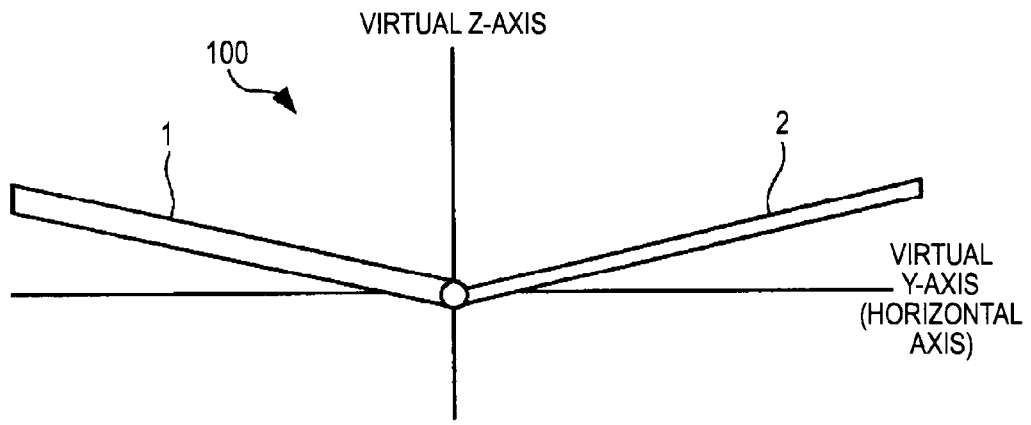
FIGS. 13A and 13B are views for explaining principles for determining a gesture motion at the time of holding the information processing apparatus in the vertical position.
Figure 13B:
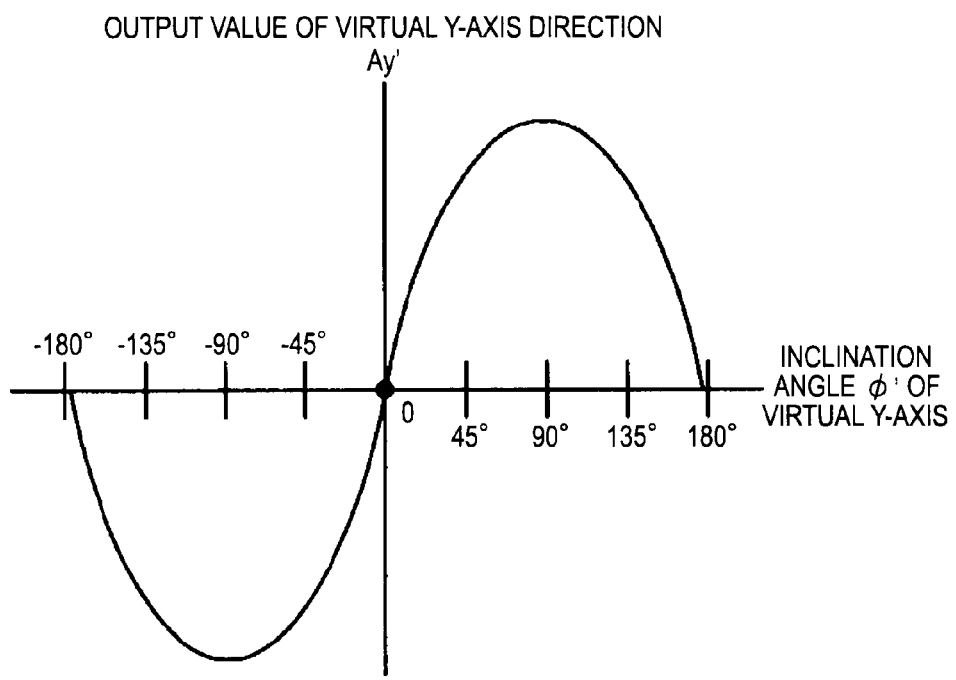
Figure 14A:
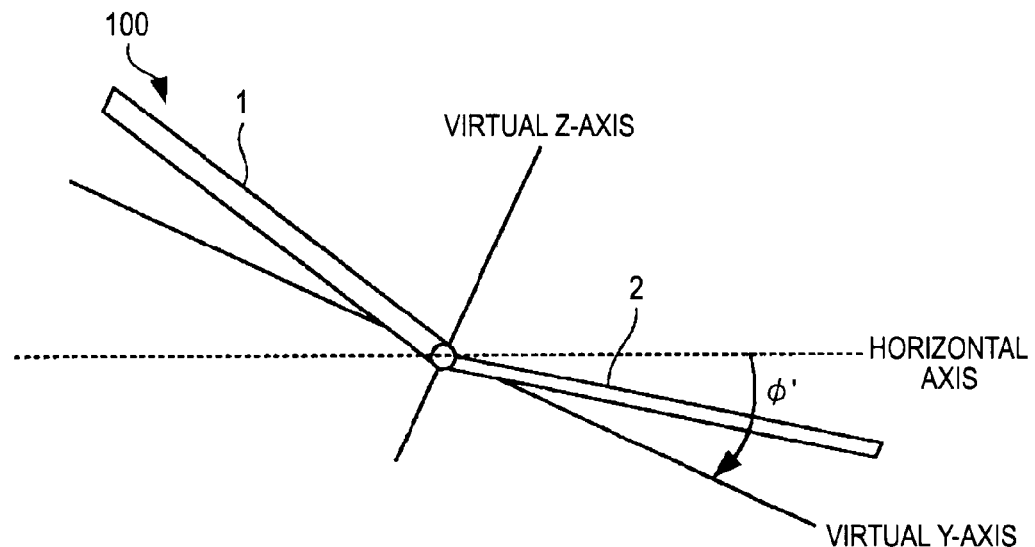
FIGS. 14A and 14B are views for explaining principles for determining a gesture motion at the time of holding the information processing apparatus in the vertical position.
Figure 14B:
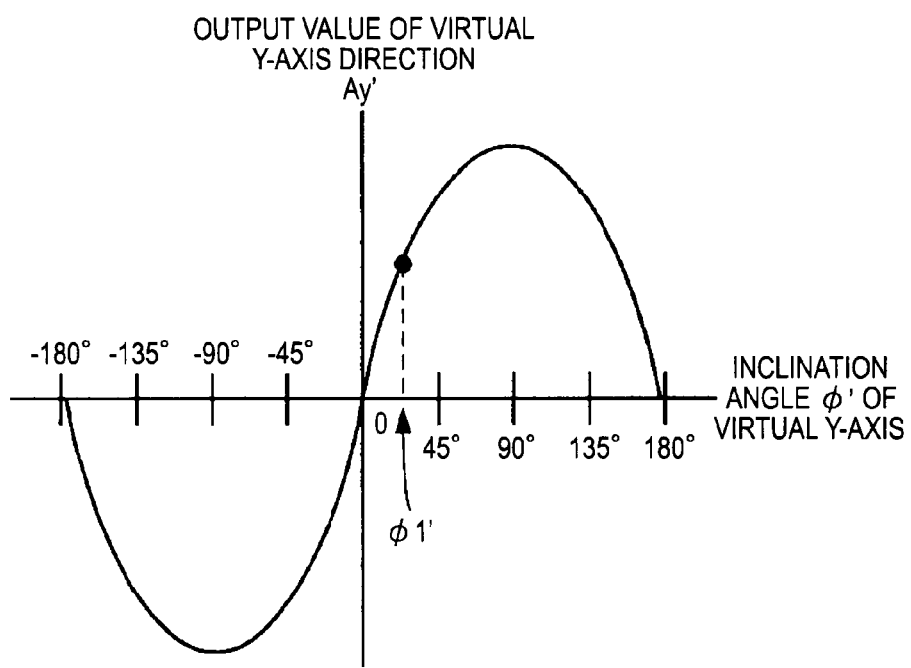

FIG. 13A is a bottom view of the information processing apparatus 100 in the state in which the information processing apparatus 100 is held in the reference posture of the vertical position. FIG. 13B is a characteristic graph showing variation of the acceleration Ay' in the virtual Y-axis direction calculated by the above expression (1) with respect to inclination from the reference posture of the vertical position of the information processing apparatus 100, in which the horizontal axis denotes inclination angles φ' from the reference posture of the virtual Y-axis and the vertical axis denotes the acceleration Ay' in the virtual Y-axis direction. FIG. 14A is a bottom view showing a holding state of the information processing apparatus 100, in which the gesture function is executed while holding the information processing apparatus 100 in the vertical position. FIG. 14B is a characteristic graph showing variation of the acceleration Ay' in the virtual Y-axis direction calculated by the above expression (1) with respect to inclination from the reference posture of the vertical position of the information processing apparatus 100, in which the horizontal axis denotes inclination angles φ' of the virtual Y-axis from the reference posture and the vertical axis denotes the acceleration Ay' in the virtual Y-axis direction. In FIG. 13A and FIG. 14A, user's hand holding the information processing apparatus 100 are not shown for simplifying explanation.

In the acceleration sensor 115 of the embodiment, as described above, both variation of the acceleration Ay with respect to variation of the inclination angle of the Y-axis and variation of the acceleration Az with respect to variation of the inclination angle of the Z-axis have the sinusoidal pattern. Therefore, variation of the acceleration Ay' with respect to variation of the inclination angle φ' of the virtual Y-axis will also have the sinusoidal pattern as shown in FIG. 13B and FIG. 14B.

In the gesture function in the holding posture of the vertical position, when the user holds the information processing apparatus 100 (apparatus body 100a) in the reference posture of the vertical position as shown in FIG. 13A, the direction of the virtual Y-axis of the acceleration sensor 115 almost corresponds to the direction of the horizontal axis. In this case, the acceleration Ay' of the virtual Y-axis direction is approximately zero (refer to a black spot in FIG. 13B) as shown in FIG. 13B.

Next, the user inclines the virtual Y-axis by turning the information processing apparatus 100 in one direction (clockwise direction in FIG. 14A) about the X-axis as the central axis by an angle φ1' from the reference posture of the vertical position as shown in FIG. 14A. The acceleration Ay' on the virtual Y-axis will be a positive acceleration value corresponding to the inclination angle φ1' of the virtual Y-axis due to the turning motion (gesture motion) (refer to a black spot in FIG. 14B). Though not shown, when the user inclines the virtual Y-axis by turning the information processing apparatus 100 counterclockwise about the X-axis as the central axis from the reference posture of the vertical position, the acceleration Ay' on the virtual Y-axis will be a negative acceleration value corresponding to the inclination angle of the virtual Y-axis.

At this time, the microcomputer 21 determines the user's gesture (the turning motion in the clockwise direction or the turning motion in the counterclockwise direction) by comparing the acceleration Ay' on the virtual Y-axis calculated by the above expression (1) with a given threshold value, and the operation execution unit 22 executes processing corresponding to the gesture. In the example, two kinds of threshold values are prepared, which are a threshold value (positive value) used when the information processing apparatus 100 is turned clockwise about the X-axis as the central axis and a threshold value (negative value) used when the information processing apparatus 100 is turned counterclockwise.

Here, the page turning of the display screen 10 is cited as an example of the gesture function performed while the information processing apparatus 100 is held in the horizontal position, and an operation example thereof will be briefly explained. For example, when the user turns the information processing apparatus 100 clockwise from the reference posture of the vertical position, the user's gesture is discriminated by the microcomputer 21 and the image of the next page is displayed. Conversely, when the user turns the information processing apparatus 100 counterclockwise from the reference posture of the vertical position, the user's gesture is discriminated by the microcomputer 21 and the image of the previous page is displayed.

In order to realize the gesture function in the posture of holding the information processing apparatus 100 so that the display unit 2 is positioned on the left side of the body 1 seen from the user's side (posture shown in FIG. 8B), the vertical axis may be set in the same manner as the above principles.

As described above, in the embodiment, when the user executes the gesture function while holding the information processing apparatus 100 in the vertical position, the virtual axis is set so that the horizontal axis (horizontal axis) becomes the reference. In this case, the gesture determination can be performed by using one determination axis in the same manner as the operation of the gesture function when holding the information processing apparatus 100 in the horizontal position.

Accordingly, when the virtual axis is set at the time of executing the gesture function while holding the information processing apparatus 100 in the vertical position as described above, the processing method of the gesture function, data used for the processing and so on can be used in common regardless of the holding manner of the information processing apparatus 100. In this case, a processing algorithm and the like of the gesture function can be used in common to realize simplification regardless of the holding posture (holding manner) of the information processing apparatus 100.

4. A Processing Example of the Gesture Function
[A Processing Procedure of the Gesture Function]

Figure 15:
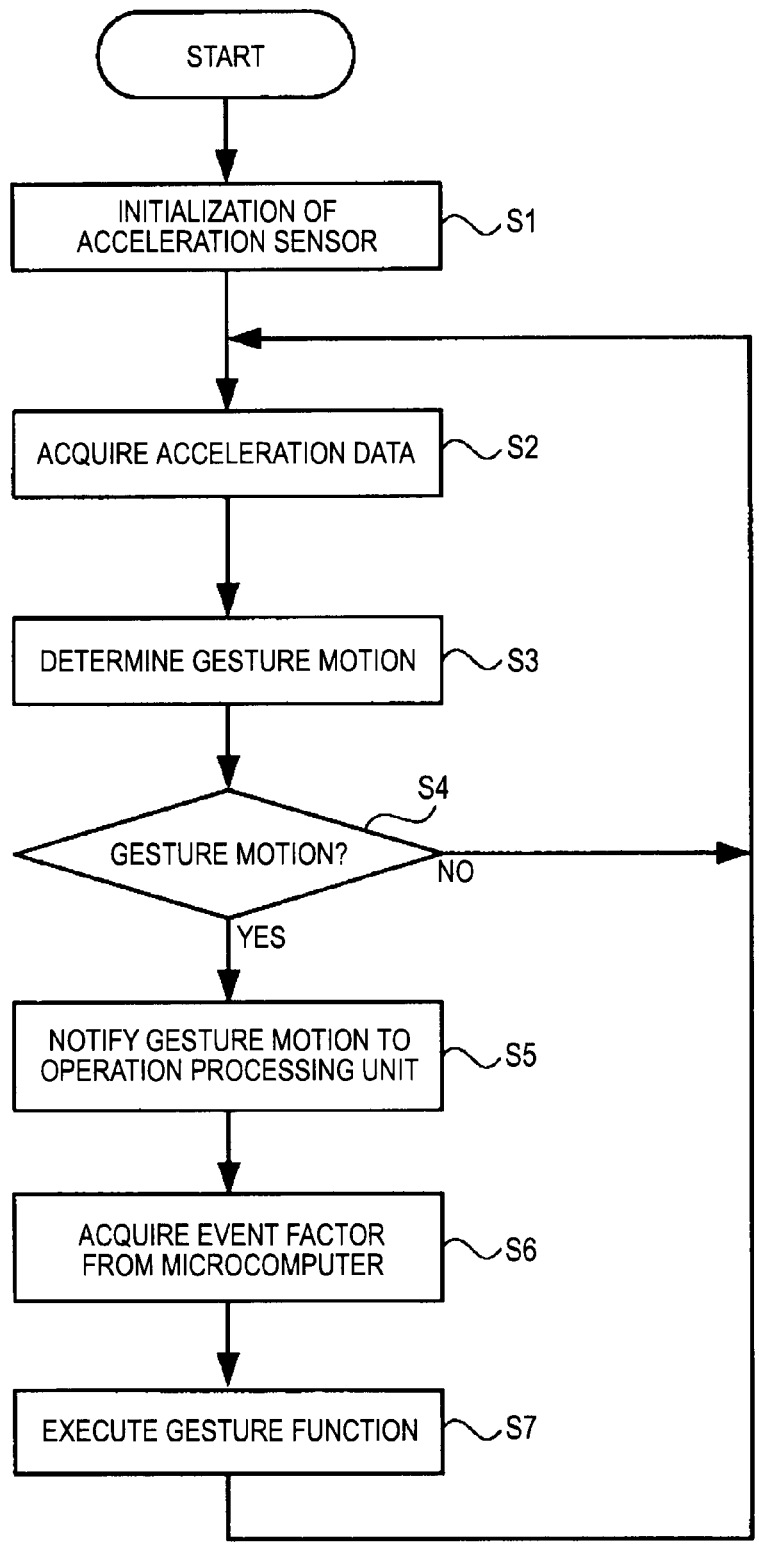
FIG. 15 is a flowchart showing the entire processing procedure of the gesture function according to the embodiment.

Next, the entire flow of processing of the gesture motion in the information processing apparatus 100 according to the embodiment will be explained with reference to FIG. 15. FIG. 15 is a flowchart showing the entire flow of a processing procedure of the gesture motion according to the embodiment.

The information processing apparatus 100 activates, for example, a processing mode of the gesture function though not shown in FIG. 15. The activation of the processing mode of the gesture function may be executed by a given operation of the user or may be automatically executed at the same time as the activation of the information processing apparatus 100.

Next, the microcomputer 21 initializes various operation settings of the acceleration sensor 115 (Step S1). According to the processing, acceleration data of respective axis directions of the acceleration sensor 115 can be regularly monitored by the microcomputer 21.

Next, the microcomputer 21 acquires acceleration data of respective axis directions from the acceleration sensor 115 (Step S2). Then, the microcomputer 21 discriminates the reference posture of the information processing apparatus 100 and determines the gesture motion executed by the user based on the acquired acceleration data of respective axis directions (Step S3). A more specific processing procedure of the determination processing of the gesture motion of Step S3 will be described later.

Next, the microcomputer 21 determines whether the user has executed the gesture motion with respect to the information processing apparatus 100 or not based on the discrimination result of Step S3 (Step S4).

When the microcomputer 21 determines that the gesture motion has not been executed by the user in Step 4, "NO" determination is made in Step S4. In this case, the process returns to Step S2 and the processes after Step S2 are repeated.

On the other hand, when the microcomputer 21 determines that the gesture motion has been executed by the user in Step S4, "YES" determination is made in Step S4. In this case, the microcomputer 21 notifies the operation execution unit 22 of the execution of the gesture motion (Step S5).

Subsequently, the operation execution unit 22 receives notification of gesture execution from the microcomputer 21 and acquires an event factor for determining the executed gesture from the microcomputer 21 (Step S6). Specifically, the operation execution unit 22 acquires information concerning the inclination direction (information indicating to which direction of the clockwise direction and the counterclockwise direction the apparatus has been turned) from the microcomputer 21 as the event factor.

Then, the operation execution unit 22 controls respective units in the information processing apparatus 100 necessary for executing the gesture function based on the acquired event factor to execute corresponding processing (Step S7). Next, the process returns to Step S2 after executing the gesture function and the processes after the above Step S2 are repeated. The gesture function is realized in this manner in the embodiment.

[A Procedure of Determination Processing of the Gesture Motion]

Figure 16:
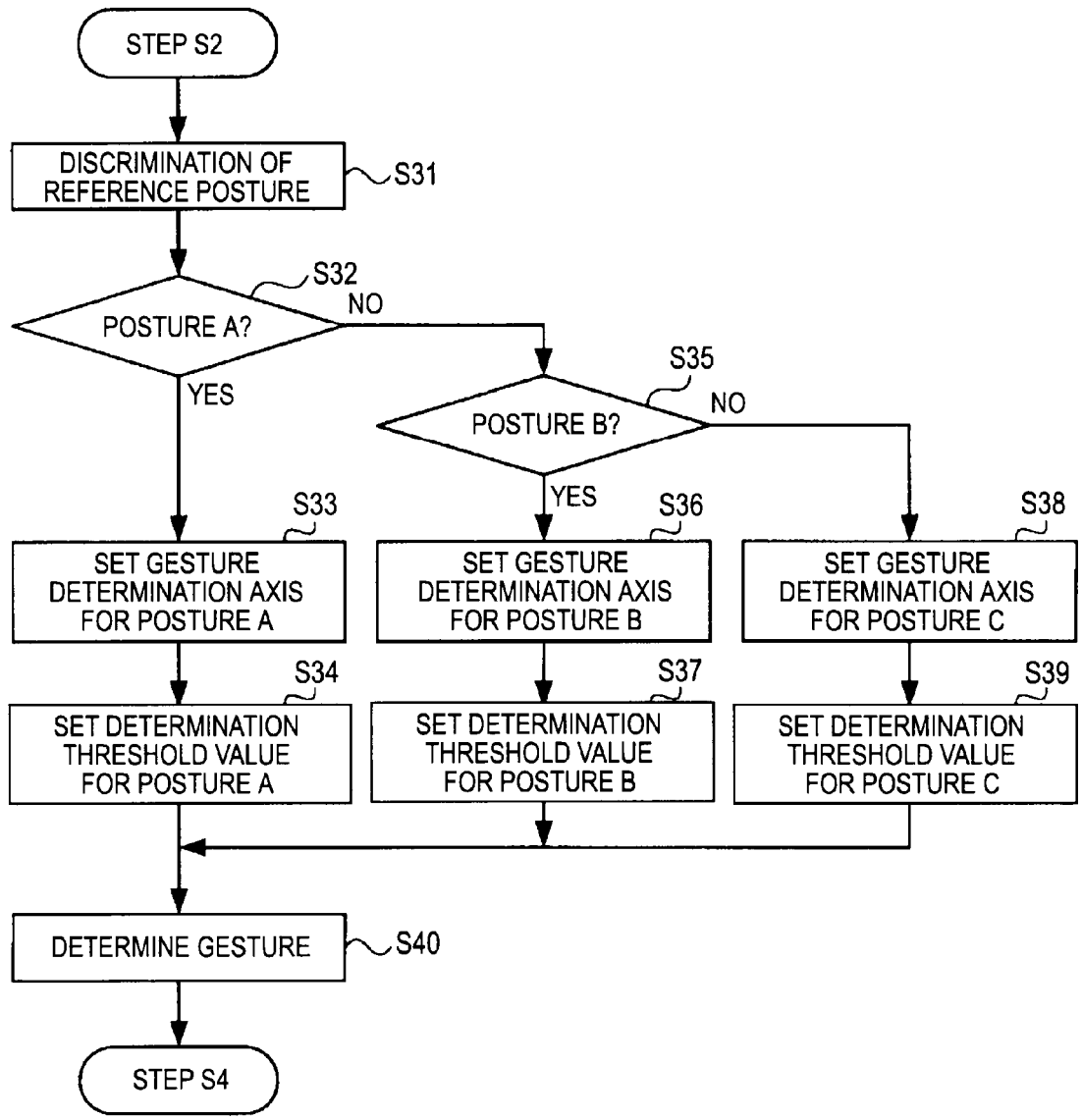
FIG. 16 is a flowchart showing a processing procedure of determining the gesture motion according to the embodiment of the present technology.

Next, a more specific procedure of determination processing of the gesture motion performed in Step S3 in FIG. 15 will be explained with reference to FIG. 16. FIG. 16 is a flowchart showing an example of determination processing performed in Step S3 of FIG. 15.

In determination of the reference posture of the information processing apparatus 100 in the determination processing shown in FIG. 16, three types of reference postures, which are the reference posture in the horizontal position shown in FIG. 6A, reference postures in the vertical positions shown in FIGS. 8A and 8B, are determined. Accordingly, the example will be explained here, in which the X-axis of the acceleration sensor 115 or the virtual Y-axis is used as the determination axis and inclination of the determination axis from the horizontal direction is calculated to execute the gesture function based on the calculation result as explained in the operation principles of the gesture function. Hereinafter, the reference posture in the horizontal position shown in FIG. 6A is referred to as a posture A and two kinds of reference postures in the vertical position shown in FIGS. 8A and 8B are referred to as a posture B and a posture C, respectively.

After the microcomputer 21 acquires acceleration data in respective axis directions of the acceleration sensor 115 in Step S2 of FIG. 15, the microcomputer 21 discriminates the reference posture of the present holding state of the information processing apparatus 100 based on the acquired acceleration data (Step S31).

Specifically, the microcomputer 21 discriminates the present reference posture of the information processing apparatus 100, for example, based on the acceleration Ax in the X-axis direction in Step S31. The acceleration Ax in the X-axis direction obtained from the acceleration sensor 115 varies in the sinusoidal pattern in accordance with inclination of the X-axis from the horizontal axis as shown in FIG. 6B. Accordingly, when the holding posture of the information processing apparatus 100 is the posture A, the value of the acceleration Ax in the X-axis direction will be a value in the vicinity of zero. When the holding posture of the information processing apparatus 100 is the posture B, the value of the acceleration Ax in the X-axis direction will be a positive value. When the holding posture of the information processing apparatus 100 is the posture C, the value of the acceleration Ax in the X-axis direction will be a negative value.

Accordingly, it is possible to discriminate whether the holding posture is in the horizontal position (posture A) or in the vertical position (posture B or posture C) by discriminating whether the value of the acceleration Ax in the X-axis direction obtained from the acceleration sensor 115 is within a given range around zero or not. When the holding posture is in the vertical position, it is possible to discriminate between the posture B and posture C by discriminating between positive and negative values of the acceleration Ax in the X-axis direction.

Next, the microcomputer 21 determines whether the discrimination result of the reference posture of the information processing apparatus 100 obtained in Step S31 is the posture A or not (Step S32).

When the discrimination result obtained in Step S31 is the posture A, "YES" determination is made in Step S32. In this case, the microcomputer 21 sets the determination axis for the gesture motion in the posture A (Step S33). Specifically, the reference posture of the information processing apparatus 100 is the posture A, the microcomputer 21 sets the determination axis for the gesture motion to the X-axis as explained in the operation principles of the gesture function. Subsequently, the microcomputer 21 sets the threshold value for determining the gesture motion in the posture A (Step S34).

Then, the microcomputer 21 determines the gesture motion executed by the user by comparing the acquired acceleration Ax in the X-axis direction with the threshold value for determination set in Step S34 (Step S40). More specifically, the microcomputer 21 determines whether the gesture motion has been executed or not by determining whether the absolute value of the acquired acceleration Ax in the X-axis direction is equal to or more than the absolute value of the threshold value. Furthermore, the microcomputer 21 determines the inclination direction (turning direction) of the information processing apparatus 100 at the gesture motion by discriminating between positive and negative values of the acceleration Ax. After that, the processes after Step S4 explained in FIG. 15 are repeated.

When the discrimination result obtained in Step S31 is not the posture A, "NO" determination is made in Step S32. In this case, the microcomputer 21 determines whether the discrimination result of the reference posture of the information processing apparatus 100 obtained in Step S31 is the posture B or not (Step S35).

When the discrimination result obtained in Step S31 is the posture B, "YES" determination is made in Step S35. In this case, the microcomputer 21 sets the determination axis for the gesture motion in the posture B (Step S36). Specifically, when the reference posture of the information processing apparatus 100 is the posture B, the microcomputer 21 sets the determination axis for the gesture motion to the virtual Y-axis as explained in the operation principles of the gesture function. Next, the microcomputer 21 sets the threshold value for determining the gesture motion in the posture B (Step S37).

Subsequently, the microcomputer 21 calculates the acceleration Ay' in the virtual Y-axis direction based on the above expression (1) from the acceleration data obtained in Step S2. Then, the microcomputer 21 determines whether the given gesture motion has been performed by the user or not by comparing the calculated acceleration Ay' of the virtual Y-axis direction with the threshold value for determination set in Step S37 (Step S40). More specifically, the microcomputer 21 determines whether the gesture motion has been executed by the user or not by determining whether the absolute value of the calculated acceleration Ay' on the virtual Y-axis is equal to or greater than the absolute value of the threshold value or not. Furthermore, the microcomputer 21 determines the inclination direction (turning direction) of the information processing apparatus 100 at the gesture motion by discriminating between positive and negative values of the acceleration Ay' at this time. After that, the processes after Step S4 explained in FIG. 15 are repeated.

On the other hand, when the discrimination result obtained in Step S31 is not the posture B, namely, when the discrimination result of the posture obtained in Step S31 is the posture C, "NO" determination is made in Step S35. In this case, the microcomputer 21 sets the determination axis for the gesture motion in the posture C (Step S38). Specifically, when the reference posture of the information processing apparatus 100 is the posture C, the microcomputer 21 sets the determination axis for the gesture motion to the virtual Y-axis in the same manner as the posture B. Next, the microcomputer 21 sets the threshold value for determining the gesture motion in the posture C (Step S39).

Subsequently, the microcomputer 21 calculates the acceleration Ay' in the virtual Y-axis direction based on the above expression (1) from the acceleration data obtained in Step S2. Then, the microcomputer 21 determines whether the given gesture motion has been performed by the user or not by comparing the calculated acceleration Ay' in the virtual Y-axis direction with the threshold value for determination set in Step S39 (Step S40). After that, the processes after Step S4 explained in FIG. 15 are repeated. In the embodiment, the discrimination of the reference posture of the information processing apparatus 100 at the time of the gesture motion and the determination of the gesture motion are performed in the above manner.

[Comparative Example]

Figure 17:
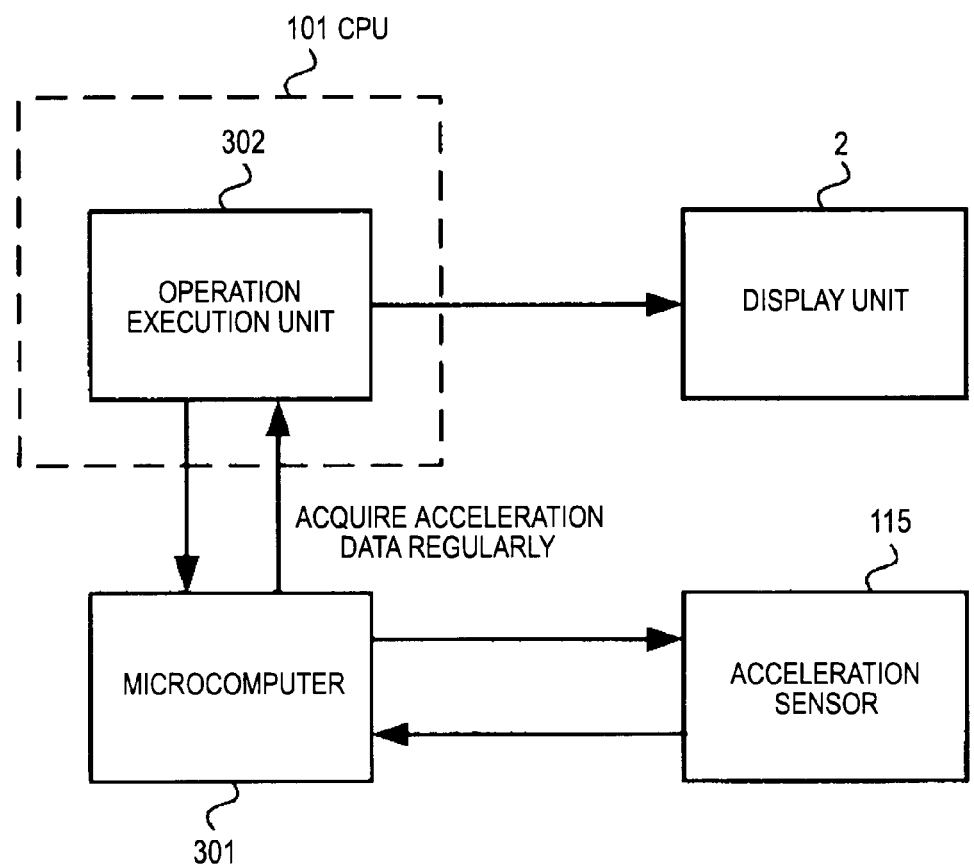
FIG. 17 is a configuration diagram of processing blocks of a gesture function according to an information processing apparatus in a comparative example.

Here, an example (comparative example) in the case where the related-art processing method of the gesture function using the acceleration sensor is applied to the information processing apparatus (notebook PC) will be specifically explained with reference to the drawings for comparison. FIG. 17 shows block configurations of a processing unit for executing the gesture function in the comparative example. In processing blocks of the gesture function shown in FIG. 17, the same numerals are given to same configurations as processing blocks of the gesture function of the above embodiment shown in FIG. 3.

The processing unit for executing the gesture function in the comparative example includes a microcomputer 301 performing processing such as keyboard control and power supply control and an operation execution unit 302 included in the CPU 101. Though the configuration itself is the same as the processing unit of the gesture function in the embodiment (FIG. 3), functions of respective units are different.

In the comparative example, the operation execution unit 302 acquires acceleration data regularly detected by the acceleration sensor 115 through the microcomputer 301 and also makes determination of the gesture motion. Also in the comparative example, the operation execution unit 302 executes not only processing of the gesture function but also operation processing corresponding to other functions in the same manner as the embodiment.

Figure 18:
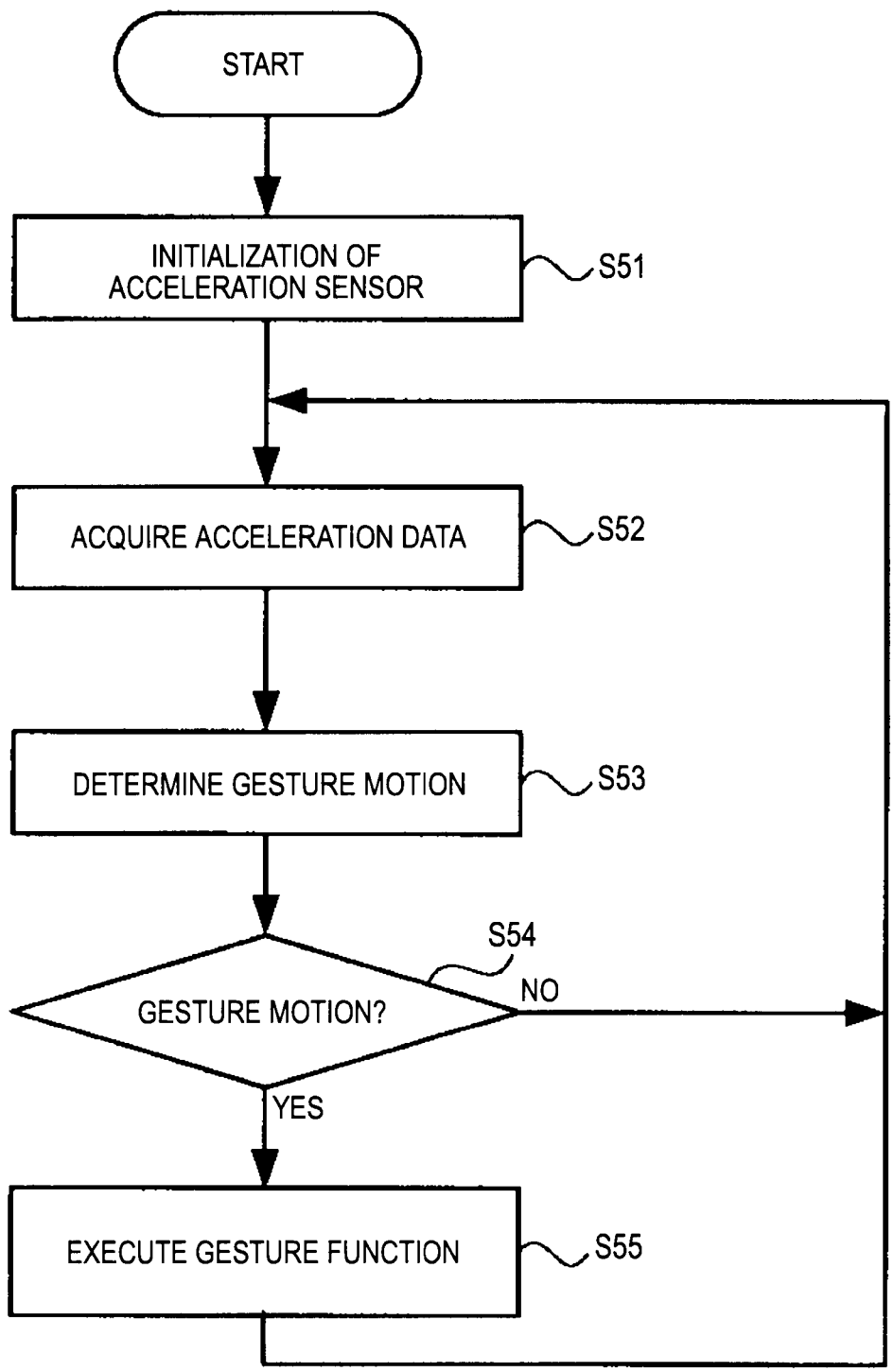
FIG. 18 is a flowchart showing the entire processing procedure of the gesture function according to the information processing apparatus in the comparative example.

A processing procedure of the gesture function in the comparative example will be shown more specifically with reference to FIG. 18. FIG. 18 is a flowchart showing the entire flow of a processing procedure of the gesture motion in the comparative example.

First, the information processing apparatus 100 activates, for example, a processing mode of the gesture function though not shown in FIG. 18. Subsequently, the microcomputer 301 initializes the various operation settings of the acceleration sensor 115 (Step S51). Next, the operation execution unit 302 acquires acceleration data in respective axis directions from the acceleration sensor 115 through the microcomputer 301 (Step S52).

Then, the operation execution unit 302 determines the gesture motion based on the acquired acceleration data in respective axis directions (Step S53). Subsequently, the operation execution unit 302 determines whether a given gesture motion has been executed with respect to the information processing apparatus 100 by the user or not based on the determination result of Step S53 (Step S54).

When the operation execution unit 302 determines that the given gesture motion has not been executed by the user in Step S54, NO determination is made in Step S54. In this case, the process returns to Step S53 and the processes after Step S52 are repeated.

On the other hand, when the operation execution unit 302 determines that the given gesture motion has been executed by the user in Step S54, YES determination is made in Step S54. In this case, the operation execution unit 302 controls respective units in the information processing apparatus 100 necessary for executing the determined gesture motion to execute corresponding processing (Step S55).

Next, after execution of the gesture function, the process returns to Step S52 and the processes after Step S52 are repeated. The gesture function is executed in this manner in the comparative example.

As described above, in the processing at the time of executing the gesture function in the comparative example, the operation execution unit 302 (CPU 101) regularly acquires acceleration data and makes determination of the gesture motion. Accordingly, it is necessary to monitor the motion of the information processing apparatus constantly in the operation execution unit 302 (main CPU), as a result, the processing amount in the operation processing unit 302 is increased as well as power consumption is increased. Moreover, there is a danger that processing speed of other functions other than the gesture function is reduced.

In contrast, the acquisition of acceleration data and the determination processing of the gesture motion are performed by the microcomputer 21 not by the operation execution unit 22 (CPU 101) in the embodiment. Accordingly, the increase of power consumption in the operation execution unit 22 can be suppressed in the embodiment.

Furthermore, the operation execution unit 22 executes a given gesture function by accessing to the microcomputer 21 only when the gesture motion is notified from the microcomputer 21. Therefore, in the embodiment, unnecessary polling processing of the operation execution unit 22 at the time of executing the gesture function can be excluded. As a result, in the processing method of the gesture function in the embodiment, processing time can be drastically reduced to thereby suppress reduction of processing speed of other functions.

That is, in the processing method of the gesture function according to the embodiment, it is possible to realize the gesture function with low power consumption as well as with smooth and quick response which have been difficult in related art.

Furthermore, when the triaxial acceleration sensor is provided at the information processing apparatus and inclination of the information processing apparatus is calculated in the comparative example (Step S53), complicated calculation using functions such as an inverse trigonometric function is normally necessary. Accordingly, it is necessary to mount the CPU 101 (main CPU) having high processing performance on the information processing apparatus for realizing the gesture function smoothly in the comparative example. Whereas in the embodiment, various determination processing at the time of executing the gesture function is performed in the microcomputer 21 and complicated calculation is not performed in the determination processing. Therefore, a microcomputer having lower processing performance can be used as the microcomputer 21 in the embodiment.

[Various Modification Examples]

The processing method of the gesture function according to the embodiment of the present technology is not limited to the above embodiment, and the same advantages can be obtained also in, for example, the following modification examples.

The example in which the virtual Y-axis is used as the determination axis as shown in FIG. 11 at the time of executing the gesture function while holding the information processing apparatus 100 in the vertical position has been explained in the embodiment, however, the present technology is not limited to this. It is possible to use the virtual Z-axis shown in FIG. 11 as the determination axis instead of the virtual Y-axis. Also in this case, the gesture motion can be determined in the same manner as explained in the operation principles of the gesture function.

The example of setting the virtual axis when the information processing apparatus 100 is held in the vertical position has been explained in the embodiment, however, the present technology is not limited to the example. Also in the case where the gesture function of, for example, associating the turning motion about the X-axis as the central axis with a given operation is executed while holding the information processing apparatus 100 in the horizontal position, the determination of the gesture motion can be made by setting the virtual Y-axis in the same manner as the embodiment.

The example in which the virtual Y-axis is set as the virtual axis when realizing the gesture function of associating the turning motion about the X-axis as the central axis with a given operation has been explained in the embodiment, however, the present technology is not limited to this. The virtual axis can be optionally set in accordance with, for example, the kind of the gesture function, the holding posture of the information processing apparatus 100 and so on. More specifically, an axis can be set as the virtual axis in the case where the acceleration on the virtual axis is approximately zero in the reference posture of the information processing apparatus 100 and the acceleration on the virtual axis varies as the posture of the information processing apparatus varies from the reference posture.

The gesture motion can be determined by setting the virtual axis appropriately in the same manner as the embodiment also in the case where the information processing apparatus 100 has the gesture function of associating the turning motion about the Y-axis or the Z-axis of the acceleration sensor 115 as the central axis with a given operation. In this case, the virtual axis which is parallel to the horizontal direction as well as in which the acceleration on the virtual axis is approximately zero in the reference posture in a surface orthogonal to the Y-axis or the Z-axis is appropriately set.

The example in which the gesture motion is executed by allowing the opening angle φa between the body 1 and the display unit 2 to be maximum (fully opened state) in the gesture motion of the vertical position has been explained in the embodiment, however, the present technology is not limited to the example. It is not always necessary that the opening angle between the body 1 and the display unit 2 is the maximum. However, it is preferable that a sensor for detecting the opening angle between the body 1 and the display unit 2 is provided and that data of the opening angle detected by the sensor and data indicating correspondence between cos φ and sin φ in the above expression (1) are previously stored in the apparatus in this case. Such data is previously stored, thereby dealing with cos φ and sin φ in the expression (1) as constants in the same manner as the embodiment and obtaining the same advantages as the embodiment.

The example in which the operation execution unit 22 acquires the event factor from the microcomputer 21 (Step S6) when the event of the gesture motion is notified to the operation execution unit 22 from the microcomputer 21 has been explained in the embodiment, however, the present technology is not limited to the example. For example, when the event factors are previously stored in the operation execution unit 22, it is also preferable that the event factor corresponding to the event notification inputted by the microcomputer 21 is determined by the operation execution unit 22 to execute a given gesture function. It is further preferable that information of the event factor is outputted to the operation execution unit 22 with the event notification from the microcomputer 21.

The example in which there are two kinds of gesture motions which are motions in reverse directions from the reference posture (the clockwise direction and the counterclockwise direction) has been explained in the embodiment, however, the present technology is not limited to the example. The present technology can be applied to the gesture function in which, for example, a gesture in one direction is associated with a given operation, and the same advantages can be obtained. In this case, it is sufficient to prepare one kind of threshold value of acceleration to be used for determining the gesture motion.

The example in which various processing of the gesture function is performed in the microcomputer 21 for performing processing keyboard control, the power supply control and the like has been explained in the embodiment, the present technology is not limited to the example. It is preferable that the microcomputer is provided for processing the gesture function separately.

The present application contains subject matter related to that disclosed in Japanese Priority Patent Application JP 2010-111780 filed in the Japan Patent Office on May 14, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   an apparatus body including a keyboard and a display attached to each other to be opened and closed;
   an acceleration sensor mounted on the apparatus body; and
   circuitry mounted on the apparatus body and configured to determine a reference posture of a holding state of the apparatus body taken when a user executes a given gesture with the apparatus body relative to an axis superimposed on and extending along an attachment point of the display and the keyboard, the reference posture being based on acceleration detected by the acceleration sensor, the circuitry determining a gesture event based on the gesture motion executed by the user by comparing a posture change of the apparatus body from the reference posture to a predetermined threshold, and execute an operation corresponding to the determined gesture motion, wherein the given gesture is a page turning gesture identified by the circuitry based on an angle between the keyboard and display while the apparatus body is in a portrait orientation, and the operation is a page turning operation.

2. The information processing apparatus according to claim 1, wherein the circuitry sets a virtual axis in which acceleration on the axis is zero when the apparatus body is in the reference position of the gesture motion and the acceleration on the axis varies in accordance with change when the apparatus body changes its posture from the reference posture, and calculates the acceleration on the virtual axis based on the acceleration detected by the acceleration sensor as well as determines the gesture event executed by the user based on the calculated acceleration on the virtual axis.

3. The information processing apparatus according to claim 2, wherein the acceleration sensor is an acceleration sensor detecting acceleration of directions of three axes orthogonal to one another, the circuitry, when the given gesture function is executed by associating a turning motion of the apparatus body about a given axis of the acceleration sensor as a central axis with the given operation, sets a virtual axis parallel to a horizontal direction in a surface orthogonal to the given axis, calculates acceleration on the virtual axis based on acceleration on two axes other than the given axis and an opening angle between the body and the display unit as well as determines the gesture event executed by the user based on the calculated acceleration on the virtual axis.

4. The information processing apparatus according to claim 3, wherein the opening angle between the body and the display is the maximum as well as 180 degree or less.

5. The information processing apparatus according to claim 1, wherein the circuitry includes an microcomputer.

6. The information processing apparatus according to claim 1, wherein a next page is displayed when the gesture event determined corresponds to a positive posture change of the apparatus body with respect to the reference posture.

7. The information processing apparatus according to claim 1, wherein a previous page is displayed when the gesture event determined corresponds to a negative posture change of the apparatus body with respect to the reference posture.

8. An operation method of an information processing apparatus including an apparatus body including a body having a keyboard and a display attached to each other to be opened and closed, an acceleration sensor mounted on the apparatus body, circuitry to determine a user gesture event executed with respect to an axis superimposed on and extending along an attachment point of the display unit and keyboard of the apparatus body and to execute a given operation corresponding to the gesture event, the method comprising:

determining, in the circuitry, a reference posture of a holding state of the apparatus body taken when the user executes a given gesture while holding the apparatus body based on acceleration detected;

determining, in the circuitry, the gesture event executed by the user by comparing posture change of the apparatus body from the reference posture to a predetermined threshold; and executing, in the operation execution unit, an operation corresponding to the determined gesture event executed by the user wherein the given gesture is a page turning gesture identified by the circuitry based on an angle between the keyboard and display while the apparatus body is in a portrait orientation, and the operation is a page turning operation.

* * * * *